US012679688B2

(12) United States Patent
Sasaki et al.

(10) Patent No.: US 12,679,688 B2

(45) Date of Patent: Jul. 14, 2026

(54) MEDIUM PROCESSING APPARATUS AND IMAGE FORMING SYSTEM INCORPORATING SAME

(71) Applicants: Kei Sasaki, Kanagawa (JP); Kazuki Seto, Kanagawa (JP); Keisuke Sugiyama, Kanagawa (JP)

(72) Inventors: Kei Sasaki, Kanagawa (JP); Kazuki Seto, Kanagawa (JP); Keisuke Sugiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 18/698,575

(22) PCT Filed: Nov. 18, 2022

(86) PCT No.: PCT/IB2022/061125

§ 371 (c)(1),
(2) Date: Apr. 4, 2024

(87) PCT Pub. No.: WO2023/094953

PCT Pub. Date: Jun. 1, 2023

(65) Prior Publication Data

US 2024/0327164 A1 Oct. 3, 2024

(30) Foreign Application Priority Data

Nov. 25, 2021 (JP) ................................ 2021-191068
Sep. 28, 2022 (JP) ................................ 2022-155336
Nov. 1, 2022 (JP) ................................ 2022-175720

(51) Int. Cl.

*B65H 37/04* (2006.01)
*G03G 15/00* (2006.01)

(52) U.S. Cl.

CPC ......... *B65H 37/04* (2013.01); *G03G 15/6544* (2013.01); *B65H 2301/5142* (2013.01); *B65H 2301/51616* (2013.01); *B65H 2402/31* (2013.01)

(58) Field of Classification Search

CPC ...... B31F 1/36; B31F 5/02; B31F 2201/0754; B31F 2201/0771; B31F 2201/0784;

(Continued)

(56) References Cited

U.S. PATENT DOCUMENTS 11,383,951 B2 * 7/2022 Kawakami ............... B41J 11/58
12,214,984 B2 * 2/2025 Akamatsu .............. B65H 37/04

(Continued)

FOREIGN PATENT DOCUMENTS

JP 2015166281 A 9/2015
JP 6057167 B2 1/2017

(Continued)

OTHER PUBLICATIONS

International Search Report and Written Opinion issued on Mar. 10, 2023 in PCT/IB2022/061125 filed on Nov. 18, 2022.

*Primary Examiner* — Leslie A Nicholson, III

(74) *Attorney, Agent, or Firm* — Harness, Dickey & Pierce, P.L.C.

(57) ABSTRACT

A medium processing apparatus includes a conveying unit, a liquid applier, a crimper, a liquid-applier pivot mechanism and a crimper pivot mechanism. The conveying unit conveys a medium in a conveyance direction. The liquid applier applies liquid to the medium conveyed by the conveying unit. The crimper presses and deforms a plurality of media including the medium to which the liquid is applied by the liquid applier, to bind the plurality of media. The liquid-applier pivot mechanism pivots the liquid applier about a pivot extending in a thickness direction of the medium. The (Continued)

crimper pivot mechanism pivots the crimper about another pivot extending in the thickness direction of the medium.

17 Claims, 29 Drawing Sheets

(58) Field of Classification Search
CPC ..... G03G 15/6544; G03G 2215/00852; B65H 37/04; B65H 2402/31; B65H 2301/5142; B65H 2301/51616; B65H 2301/43828; B65H 2301/5162; B65H 2801/27
USPC ........................................................ 270/58.08
See application file for complete search history.

(56) References Cited

U.S. PATENT DOCUMENTS

| | | | | |
|---|---|---|---|---|
| 2020/0307945 | A1 | 10/2020 | Mori et al. | |
| 2020/0317462 | A1 | 10/2020 | Kawakami | |
| 2022/0334525 | A1 | 10/2022 | Sasaki et al. | |
| 2022/0394145 | A1 | 12/2022 | Seto et al. | |
| 2024/0025691 | A1* | 1/2024 | Inaba | B65H 37/04 |
| 2024/0317536 | A1* | 9/2024 | Fukuchi | B42C 1/12 |
| 2024/0400337 | A1* | 12/2024 | Yamada | B65H 37/04 |

FOREIGN PATENT DOCUMENTS

| | | | |
|---|---|---|---|
| JP | 2017013930 | A | 1/2017 |
| JP | 2022187326 | A | 12/2022 |

* cited by examiner

MEDIUM PROCESSING APPARATUS AND IMAGE FORMING SYSTEM INCORPORATING SAME

TECHNICAL FIELD

Embodiments of the present disclosure relate to a medium processing apparatus and an image forming system incorporating the medium processing apparatus.

BACKGROUND ART

Medium processing apparatuses are known in the related art that bind, into a bundle, sheet-like media on which images are formed by image forming apparatuses. Since sheets of paper are widely known as an example of the sheet-like media, a "sheet bundle" that is a stack of sheets of paper is used as an example of a bundle of sheet-like media in the following description. Some medium processing apparatuses include a crimper or crimping unit that can perform so-called "crimp binding" without using metal binding needles (staples) from a viewpoint of resource saving and reduction in environmental load. Specifically, the crimper or crimping unit sandwiches a sheet bundle with serrate binding teeth to press and deform the sheet bundle.

An increased number of sheets of the sheet bundle hamper the binding teeth in biting into the sheet bundle and may cause some sheets to peel off from the bound sheets. Thus, the crimp binding has some difficulties in keeping the sheet bundle bound as appropriate. In order to increase the binding strength, some medium processing apparatuses that execute the crimp binding include a liquid applier or liquid application unit that applies liquid in advance to a position on a sheet where the binding teeth contact the sheet, to allow the binding teeth to easily bite into a sheet bundle (for example, see Patent Literature (PTL) 1). In the following description, the position where the binding teeth contact a sheet may be referred to as a "binding position."

CITATION LIST

Patent Literature

[PTL 1]

Japanese Unexamined Patent Application Publication No. 2015-166281

SUMMARY OF INVENTION

Technical Problem

The medium processing apparatuses having the above-described configuration can perform, for example, "parallel binding" and "oblique binding." The parallel binding is a way of binding sheets with a longitudinal direction of binding teeth parallel to a width direction of the sheets. The oblique binding is a way of binding sheets with the longitudinal direction of the binding sheets inclined with respect to the width direction of the sheets. However, when the liquid is applied to an increased range of the sheets to appropriately apply the liquid to the respective binding positions for the parallel binding and the oblique binding, the sheets may be wrinkled, or the images formed on the sheets may be blurred.

In light of the above-described problems, it is an object of the present invention to provide a technique of applying liquid to an appropriately limited range on media for a medium processing apparatus that can perform the crimp binding in different binding postures.

Solution to Problem

A medium processing apparatus includes a conveying unit, a liquid applier, a crimper, a liquid-applier pivot mechanism and a crimper pivot mechanism. The conveying unit conveys a medium in a conveyance direction. The liquid applier applies liquid to the medium conveyed by the conveying unit. The crimper presses and deforms a plurality of media including the medium to which the liquid is applied by the liquid applier, to bind the plurality of media. The liquid-applier pivot mechanism pivots the liquid applier about a pivot extending in a thickness direction of the medium. The crimper pivot mechanism pivots the crimper about another pivot extending in the thickness direction of the medium.

An image forming system includes an image forming apparatus and the medium processing apparatus described above. The image forming apparatus forms an image on a medium. The medium processing apparatus crimps and binds the plurality of media on each of which the image is formed by the image forming apparatus.

Advantageous Effects of Invention

According to one aspect of the present disclosure, a medium processing apparatus that can perform the crimp binding in different binding postures applies liquid to an appropriately limited range on media.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

Figure 1:
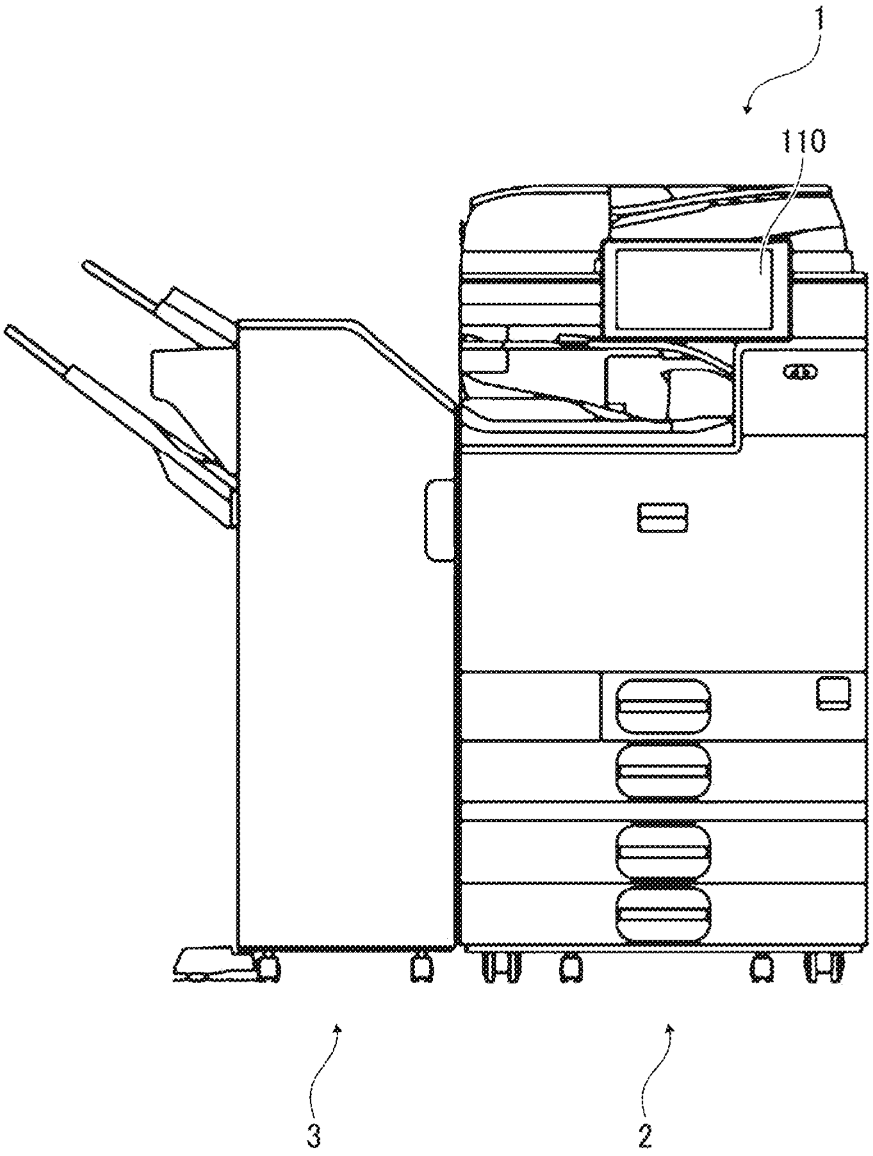
FIG. 1 is a diagram illustrating the overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. For the sake of simplicity, like reference numerals are given to identical or corresponding constituent elements such as parts and materials having the same functions, and redundant descriptions thereof are omitted unless otherwise required. As used herein, the term "connected/coupled" includes both direct connections and connections in which there are one or more intermediate connecting elements.

Initially, a description is given of a first embodiment of the present disclosure. With reference to the drawings, a description is now given of an image forming system 1 according to an embodiment of the present disclosure. FIG. 1 is a diagram illustrating the overall configuration of the image forming system 1. The image forming system 1 has a function of forming an image on a sheet P (medium) and performing post-processing on the sheet P on which the image is formed. As illustrated in FIG. 1, the image forming system 1 includes an image forming apparatus 2 and a post-processing apparatus 3 (medium processing apparatus).

The image forming apparatus 2 forms an image on the sheet P and outputs the sheet P bearing the image to the post-processing apparatus 3. The image forming apparatus 2 includes a tray that accommodates the sheet P, a conveying unit that conveys the sheet P accommodated in the tray, and an image forming unit that forms an image on the sheet P conveyed by the conveying unit. The image forming unit may be an inkjet image forming unit that forms an image with ink or an electrophotographic image forming unit that forms an image with toner. Since the image forming apparatus 2 has a typical configuration, a detailed description of the configuration and functions of the image forming apparatus 2 are omitted unless otherwise required.

Figure 2:
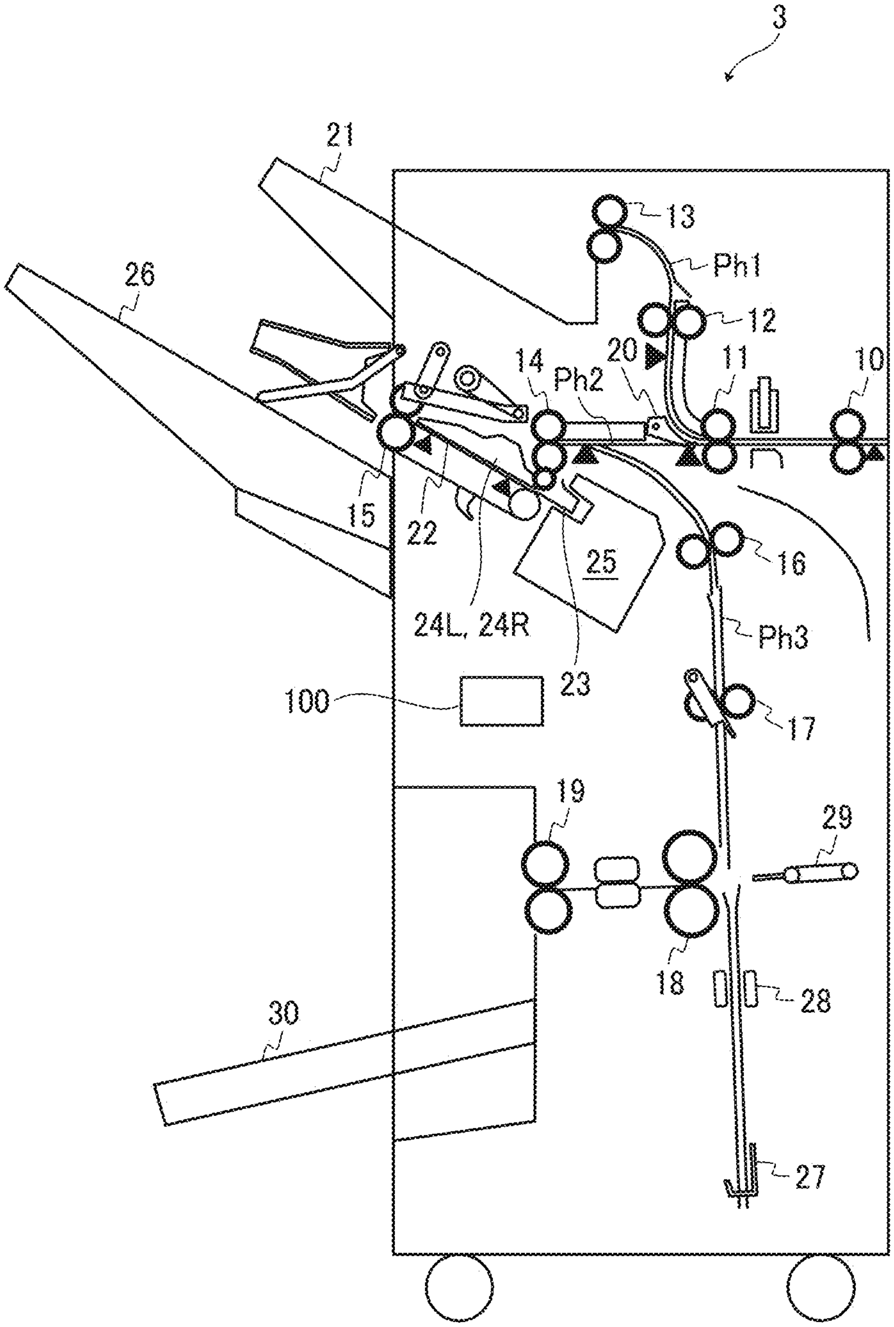
FIG. 2 is a diagram illustrating an internal configuration of a post-processing apparatus according to a first embodiment of the present disclosure.

FIG. 2 is a diagram illustrating an internal configuration of the post-processing apparatus 3 according to the first embodiment of the present disclosure. The post-processing apparatus 3 performs post-processing on the sheet P on which an image is formed by the image forming apparatus 2. The post-processing according to the present embodiment includes binding without using binding needles. Specifically, the binding without using binding needles is a process to bind, without using binding needles, the sheets P on each of which an image is formed as a bundle of sheets P, which may be referred to as a "sheet bundle Pb" in the following description. More specifically, the binding according to the present embodiment is so-called "crimp binding," in other words, pressing and deforming the sheet bundle Pb at a binding position. The binding includes edge stitching as a process to bind an edge of the sheet bundle Pb and saddle stitching as a process to bind the center of the sheet bundle Pb.

The post-processing apparatus 3 includes conveyance roller pairs 10 to 19 (conveying units) and a switching claw 20. The conveyance roller pairs 10 to 19 convey, inside the post-processing apparatus 3, the sheet P supplied from the image forming apparatus 2. Specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph is a passage extending to an output tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to an output tray 26 via an internal tray 22. The third conveyance passage Ph3 is a passage branching from the first conveyance passage Ph1 between the conveyance roller pairs 11 and 14 in the conveyance direction and extending to an output tray 30.

The switching claw 20 is disposed at a branching position of the first conveyance passage Ph1 and the second conveyance passage Ph2.

The switching claw 20 can be switched between a first position and a second position. The switching claw 20 in the first position guides the sheet P to be output to the output tray 21 through the first conveyance passage Ph1. The switching claw 20 in the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in the reverse direction to guide the sheet P to the third conveyance passage Ph3. The post-processing apparatus 3 further includes a plurality of sensors that detects the positions of the sheet P in the first conveyance passage Ph1, the second conveyance passage Ph2, and the third conveyance passage Ph3. Each of the plurality of sensors is indicated by a black triangle mark in FIG. 2.

The post-processing apparatus 3 includes the output tray 21. The sheet P that is output through the first conveyance passage Ph1 rests on the output tray 21. Among the sheets P supplied from the image forming apparatus 2, the sheets P that are not bound are output to the output tray 21.

Figure 6A:
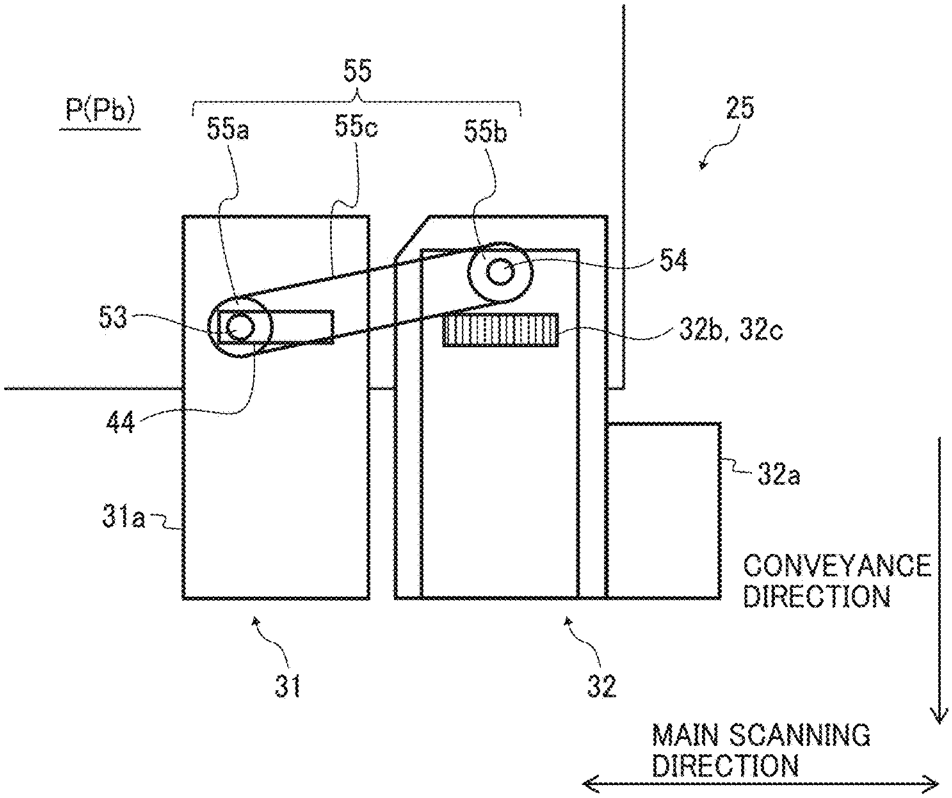
FIGS. 6A and 6B are plan views of the edge binding unit of FIG. 3.
Figure 6B:
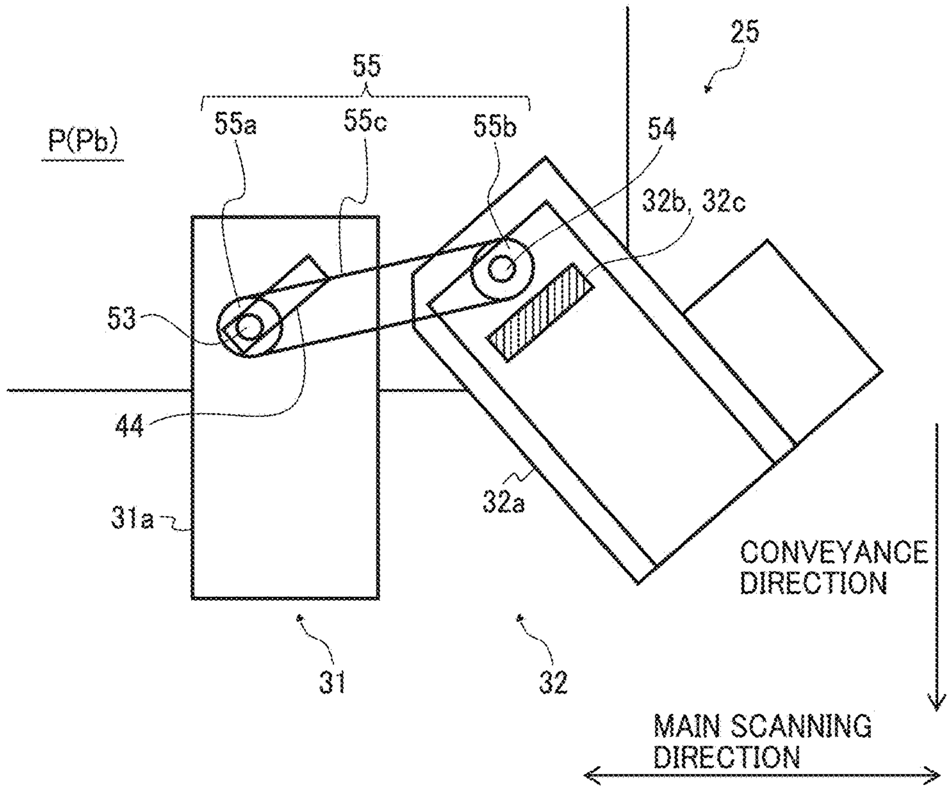
Figure 11A:
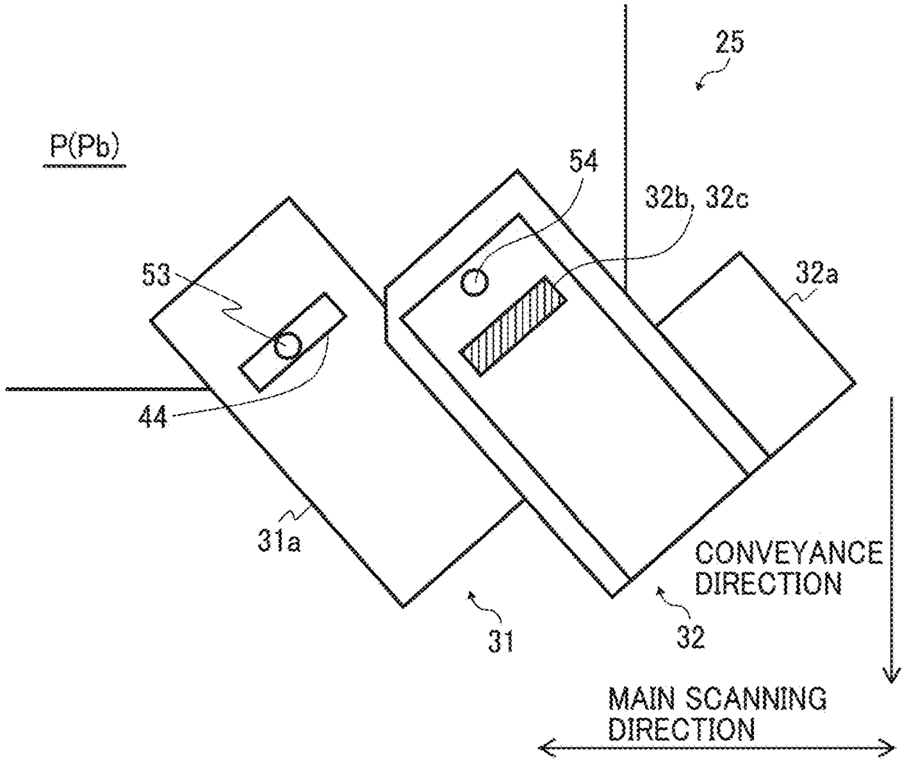
FIGS. 11A and 11B are diagrams illustrating the liquid applier and the crimper in postures different from the postures illustrated in FIGS. 6A and 6B.
Figure 11B:
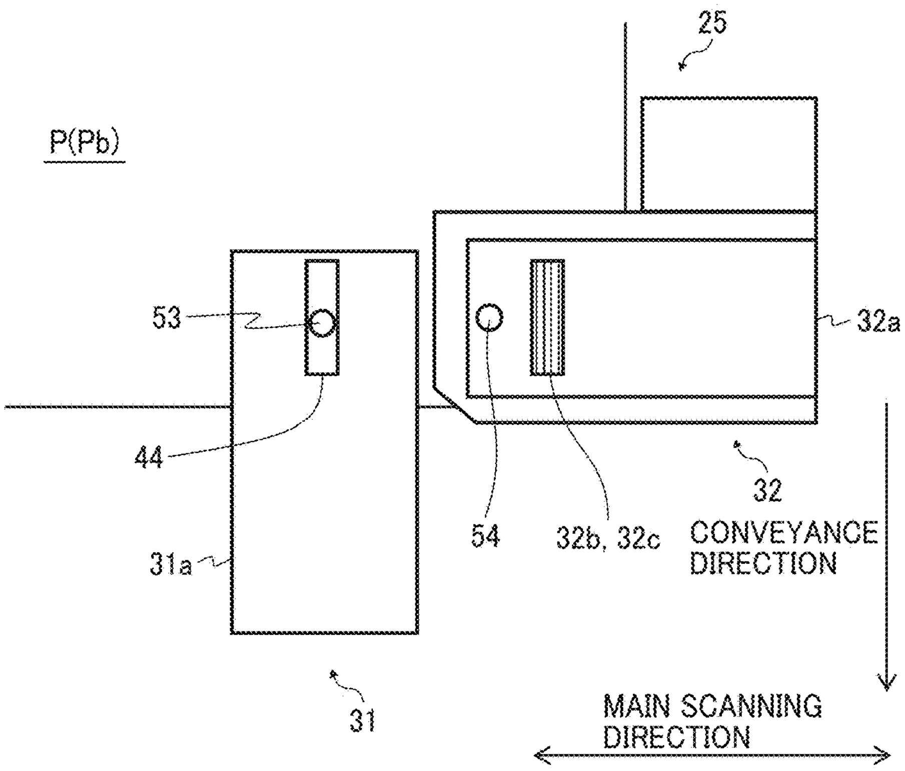

The post-processing apparatus 3 further includes the internal tray 22 (tray), an end fence 23, side fences 24L and 24R, an edge binding unit 25, and the output tray 26. The internal tray 22, the end fence 23, the side fences 24L and 24R, and the edge binding unit 25 perform the edge stitching on the sheet bundle Pb constructed of a plurality of sheets P conveyed to the internal tray 22 from the second conveyance passage Ph2. The "edge stitching" includes "parallel binding," "oblique binding," and "vertical binding." The "parallel binding" is a process to bind the sheet bundle Pb along one side of the sheet bundle Pb parallel to the main scanning direction as illustrated in FIG. 6A. The "oblique binding" is a process to bind a corner of the sheet bundle Pb as illustrated in FIG. 6B. The "vertical binding" is a process to bind the sheet bundle Pb along one side of the sheet bundle Pb parallel to the conveyance direction as illustrated in FIG. 11B. Among the sheets P supplied from the image forming apparatus 2, the sheet bundle Pb subjected to the edge stitching is output to the output tray 26. In the following description, a direction in which the sheet P is conveyed from the conveyance roller pair 15 toward the end fence 23 is defined as a "conveyance direction." A direction orthogonal to a thickness direction of the sheet P and to the conveyance direction of the sheet P is defined as a "main scanning direction (width direction of the sheet P)."

The sheets P that are sequentially conveyed through the second conveyance passage Ph2 are temporarily placed on the internal tray 22. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb supported on the internal tray 22. The edge binding unit 25 binds an end of the sheet bundle Pb aligned by the end fence 23 and the side fences 24L and 24R. Then, the conveyance roller pair 15 outputs the sheet bundle Pb subjected to the edge stitching to the output tray 26.

Figure 3:
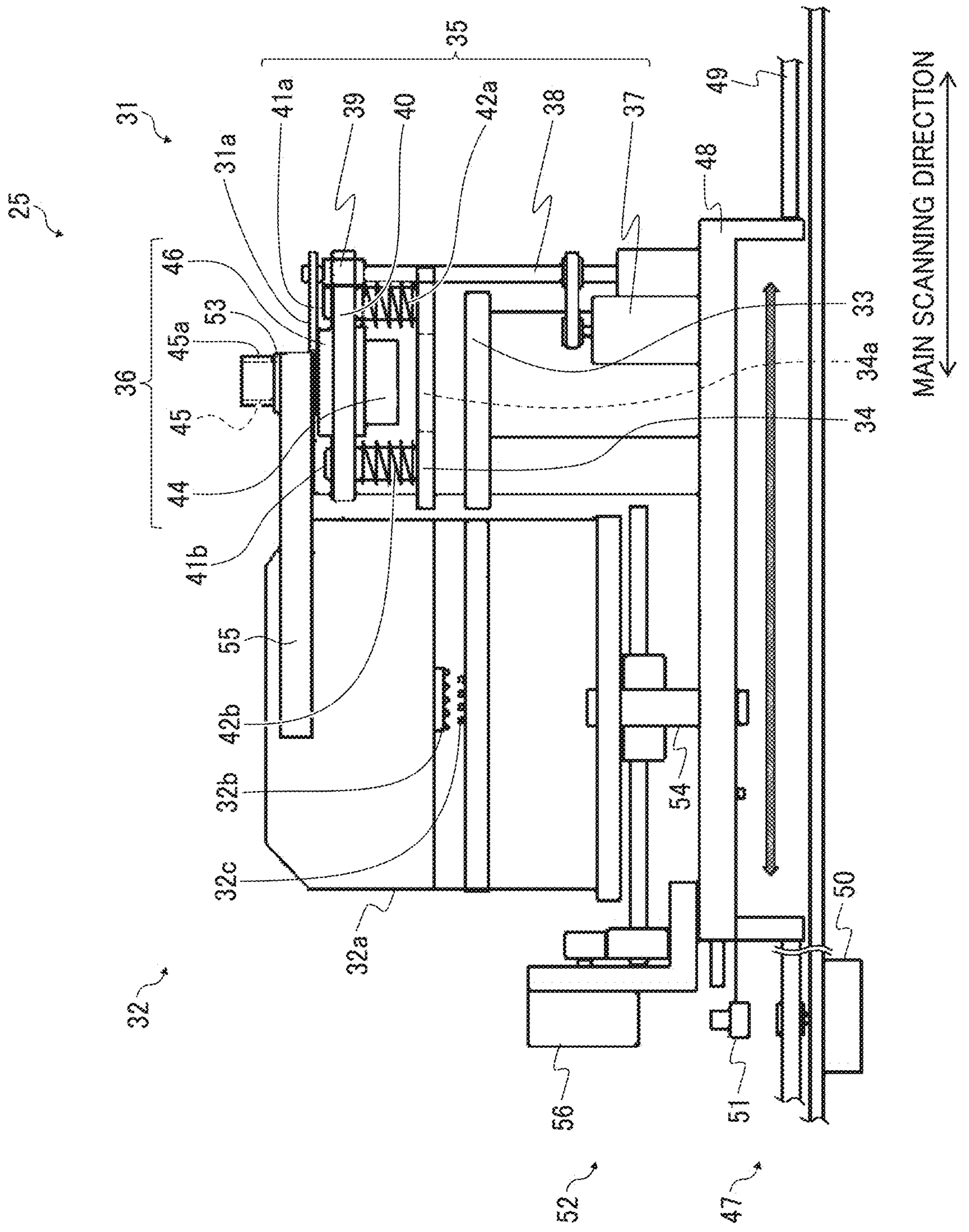
FIG. 3 is a schematic view of an upstream side of an edge binding unit of the post-processing apparatus of FIG. 2 in a conveyance direction.
Figure 4:
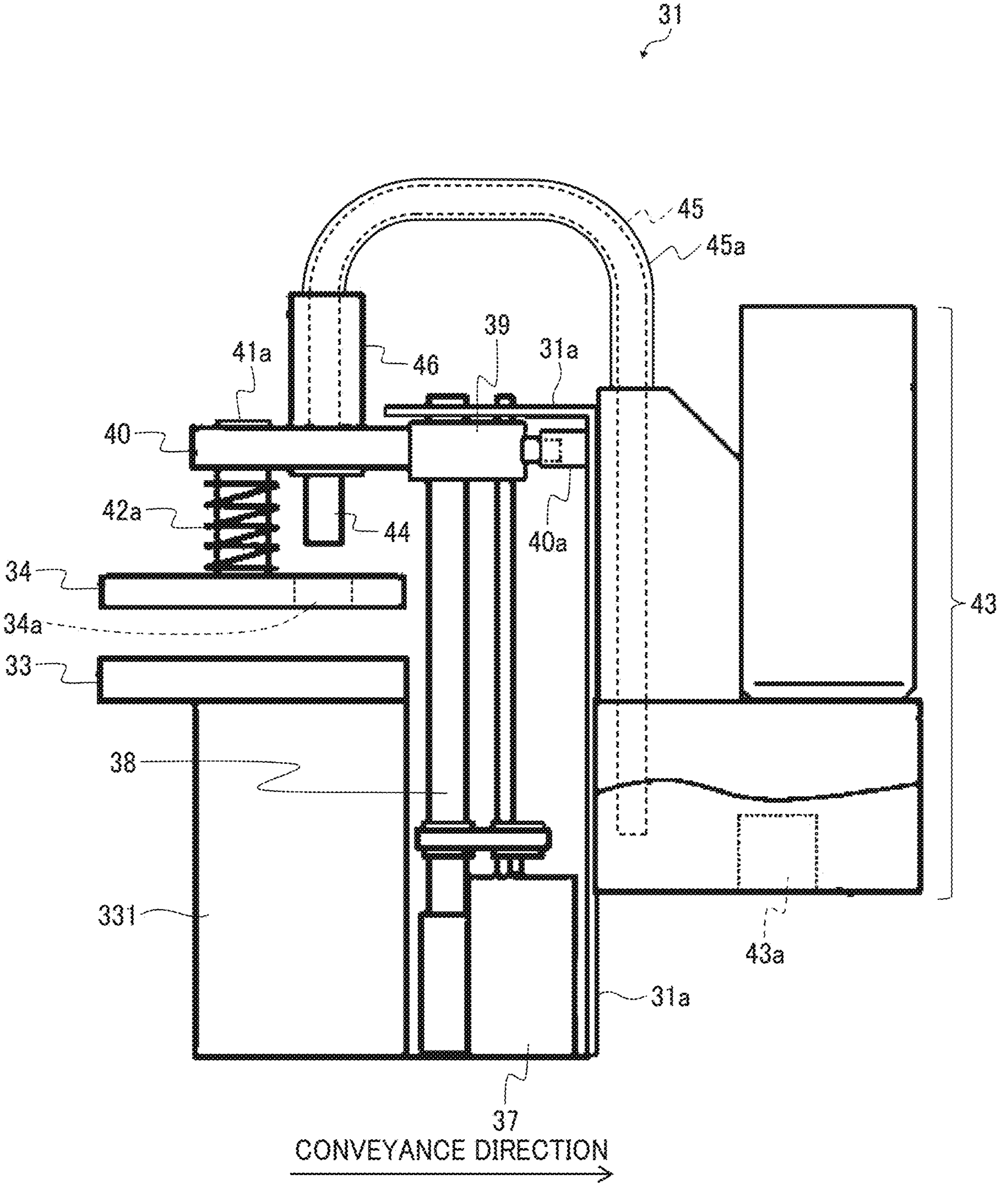
FIG. 4 is a schematic view of a liquid applier of the edge binding unit of FIG. 3 in a main scanning direction.

FIG. 3 is a schematic view of an upstream side of the edge binding unit 25 in the conveyance direction. FIG. 4 is a schematic view of a liquid applier 31 of the edge binding unit 25 in the main scanning direction. As illustrated in FIG. 3, the edge binding unit 25 includes the liquid applier 31 and a crimper 32. The liquid applier 31 and the crimper 32 are disposed downstream from the internal tray 22 in the conveyance direction and adjacent to each other in the main scanning direction.

The liquid applier 31 applies liquid (for example, water) that is stored in a liquid storage tank 43 to the sheet P placed on the internal tray 22. In the following description, the application of liquid may be referred to as "liquid application." The liquid applier 31 can be moved in the main scanning direction together with the crimper 32 by a driving force transmitted from a slide motor 50. As illustrated in FIGS. 3 and 4, the liquid applier 31 includes a lower pressure plate 33, an upper pressure plate 34, a movement mechanism 35, and a liquid application mechanism 36. The components (the lower pressure plate 33, the upper pressure plate 34, the movement mechanism 35, and the liquid application mechanism 36) of the liquid applier 31 are held by a liquid application frame 31*a*.

More specifically, the liquid that is stored in the liquid storage tank 43 and used for the "liquid application" includes, as a main component, a liquid hydrogen-oxygen compound represented by the chemical formula $H_2O$.

The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid stored in the liquid storage tank 43 may include an additive in addition to the main component. The liquid stored in the liquid storage tank 43 may include residual chlorine used as tap water. Preferably, for example, the liquid stored in the liquid storage tank 43 may include, as additives, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply for the purpose of crimp binding because the tap water is easy to obtain and manage. A liquid including water as a main component as exemplified above enhances the binding strength of the sheet bundle Pb, as compared with a liquid of which the main component is not water.

The lower pressure plate 33 and the upper pressure plate 34 are disposed downstream from the internal tray 22 in the conveyance direction. The lower pressure plate 33 supports, from below, the sheet P or the sheet bundle Pb placed on the internal tray 22. The lower pressure plate 33 is disposed on a lower-pressure-plate holder 331. The upper pressure plate 34 can move (up and down) in the thickness direction of the sheet P above the sheet P or the sheet bundle Pb supported on the internal tray 22. In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as the "thickness direction." The upper pressure plate 34 has a through hole 34a penetrating in the thickness direction at a position where the through hole 34a faces an end of a liquid application member 44 attached to a base plate 40.

The movement mechanism 35 moves the upper pressure plate 34, the base plate 40, and the liquid application member 44 in the thickness direction of the sheet P or the sheet bundle Pb. The movement mechanism 35 according to the present embodiment moves the upper pressure plate 34, the base plate 40, and the liquid application member 44 in conjunction with each other with a single movement motor 37. The movement mechanism 35 includes, for example, the movement motor 37, a trapezoidal screw 38, a nut 39, the base plate 40, columnar members 41a and 41b, and coil springs 42a and 42b.

The movement motor 37 generates a driving force to move the upper pressure plate 34, the base plate 40, and the liquid application member 44. The trapezoidal screw 38 extends in a vertical direction in FIGS. 3 and 4 and is rotatably attached to the liquid application frame 31a. The trapezoidal screw 38 is coupled to an output shaft of the movement motor 37 via, for example, a pulley and a belt. The nut 39 is screwed to the trapezoidal screw 38. The trapezoidal screw 38 is rotated by the driving force transmitted from the movement motor 37. The rotation of the trapezoidal screw 38 moves the nut 39.

The base plate 40 is disposed above the upper pressure plate 34. The base plate 40 holds the liquid application member 44 with the end of the liquid application member 44 projecting downward. The base plate 40 is coupled to the trapezoidal screw 38 to move together with the trapezoidal screw 38. The position of the base plate 40 in the vertical direction is detected by a movement sensor 40a (see FIG. 7).

The columnar members 41a and 41b project downward from the base plate 40 around the end of the liquid application member 44. The columnar members 41a and 41b can move relative to the base plate 40 in the thickness direction. The columnar members 41a and 41b have respective lower ends holding the upper pressure plate 34. The columnar members 41a and 41b have respective upper ends provided with stoppers that prevent the columnar members 41a and 41b from being removed from the base plate 40. The coil springs 42a and 42b are fitted around the columnar members 41a and 41b, respectively, between the base plate 40 and the upper pressure plate 34. The coil springs 42a and 42b bias the upper pressure plate 34 and the columnar members 41a and 41b downward with respect to the base plate 40.

The liquid application mechanism 36 applies liquid to the sheet P or the sheet bundle Pb supported on the internal tray 22. Specifically, the liquid application mechanism 36 brings the end of the liquid application member 44 into contact with the sheet P or the sheet bundle Pb to apply the liquid to at least one sheet P of the sheet bundle Pb. The liquid application mechanism 36 includes the liquid storage tank 43, the liquid application member 44, a supply member 45, and a joint 46.

The liquid storage tank 43 stores the liquid to be supplied to the sheet P or the sheet bundle Pb. The amount of liquid stored in the liquid storage tank 43 is detected by a liquid amount sensor 43a. The liquid application member 44 supplies the liquid stored in the liquid storage tank 43 to the sheet P or the sheet bundle Pb. The liquid application member 44 is supported by the base plate 40 with the end of the liquid application member 44 facing downward. The liquid application member 44 is made of a material having a relatively high liquid absorption (for example, sponge or fiber).

The supply member 45 is an elongated member having a base end immersed in the liquid stored in the liquid storage tank 43 and an end coupled to the liquid application member 44. Like the liquid application member 44, for example, the supply member 45 is made of a material having a relatively high liquid absorption. Accordingly, the liquid absorbed from the base end of the supply member 45 is supplied to the liquid application member 44 by capillary action.

A protection member 45a is an elongated cylindrical body (for example, a tube) that is fitted around the supply member 45. Such a configuration prevents the liquid absorbed by the supply member 45 from leaking or evaporating.

Each of the supply member 45 and the protection member 45a is made of a flexible material. The joint 46 fixes the liquid application member 44 to the base plate 40. Accordingly, the liquid application member 44 keeps projecting downward from the base plate 40 with the end of the liquid application member 44 facing downward when the liquid application member 44 is moved by the movement mechanism 35.

The crimper 32 presses and deforms the sheet bundle Pb with serrate binding teeth 32b and 32c to bind the sheet bundle Pb. In the following description, such a binding way may be referred to as "crimp binding." In other words, the crimper 32 crimps and binds the sheet bundle Pb or performs the crimp binding on the sheet bundle Pb. In short, the crimper 32 binds the sheet bundle Pb without using binding needles. The components (the binding teeth 32b (upper crimping teeth) and the binding teeth 32c (lower crimping teeth)) of the crimper 32 are disposed on a crimping frame 32a.

Figure 5A:
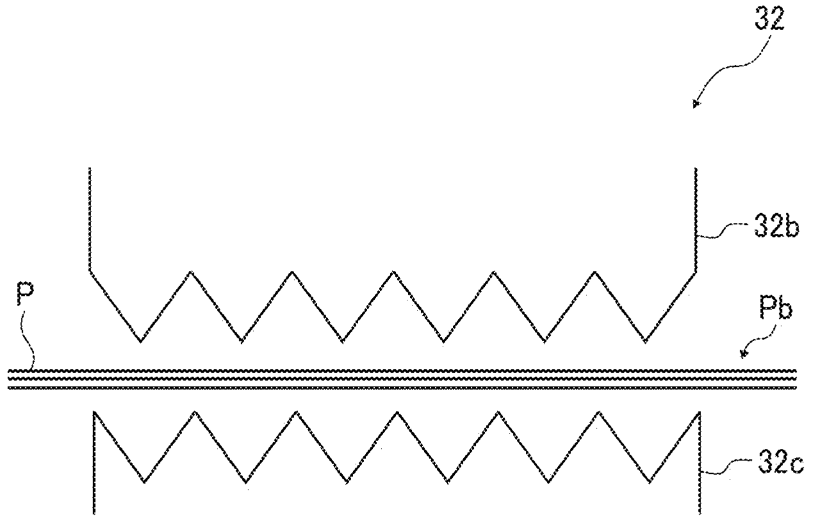
FIGS. 5A and 5B are schematic diagrams illustrating a configuration of a crimper of the post-processing apparatus of FIG. 2.
Figure 5B:

FIGS. 5A and 5B are schematic diagrams illustrating the configuration of the crimper 32. As illustrated in FIGS. 5A and 5B, the crimper 32 includes the binding teeth 32b and the binding teeth 32c in pair, which may be referred to as a pair of binding teeth 32b and 32c in the following description. The binding teeth 32b and the binding teeth 32c are disposed to face each other in the thickness direction of the sheet bundle Pb with the sheet bundle Pb supported on the internal tray 22 and interposed between the binding teeth 32b and the binding teeth 32c.

The binding teeth 32b and the binding teeth 32c have respective serrate faces facing each other. The serrate face of each of the binding teeth 32b and the binding teeth 32c includes concave portions and convex portions alternately formed. The concave portions and the convex portions of the binding teeth 32b are shifted from those of the binding teeth 32c so that the binding teeth 32b are engaged with the binding teeth 32c. The binding teeth 32b and the binding teeth 32c are brought into contact with and separated from each other by a driving force of a contact-separation motor 32d (see FIG. 7).

In a process in which the sheets P of the sheet bundle Pb are supplied to the internal tray 22, the binding teeth 32b and the binding teeth 32c are apart from each other as illustrated in FIG. 5A. When all the sheets P of the sheet bundle Pb are placed on the internal tray 22, the binding teeth 32*b* and the binding teeth 32*c* are engaged with each other to press and deform the sheet bundle Pb in the thickness direction as illustrated in FIG. 5B.

As a result, the sheet bundle Pb supported on the internal tray 22 is crimped and bound. The sheet bundle Pb thus crimped and bound is output to the output tray 26 by the conveyance roller pair 15.

The configuration of the crimper 32 as a crimping mechanism is not limited to the configuration of the present embodiment provided that the binding teeth 32*b* and the binding teeth 32*c* of the crimping mechanism are engaged with each other. For example, the crimping mechanism may bring the binding teeth 32*b* and the binding teeth 32*c* into contact with each other and separate the binding teeth 32*b* and the binding teeth 32*c* form each other with a link mechanism and a driving source that simply rotates forward or that rotates forward and backward (for example, the crimping mechanism disclosed in Japanese Patent No. 6057167). Alternatively, the crimping mechanism may employ a linear motion system to linearly bring the binding teeth 32*b* and the binding teeth 32*c* into contact with each other and separate the binding teeth 32*b* and the binding teeth 32*c* form each other with a screw mechanism that converts the rotational motion of a driving source into linear motion.

As illustrated in FIG. 3, the edge binding unit 25 includes a slide mechanism 47. The slide mechanism 47 moves the edge binding unit 25 (in other words, the liquid applier 31 and the crimper 32) in the main scanning direction along a downstream end in the conveyance direction of the sheet P supported on the internal tray 22. According to the present embodiment, the slide mechanism 47 serves as a main-scanning movement unit that moves the liquid applier 31 and the crimper 32 simultaneously in the main scanning direction. The slide mechanism 47 includes, for example, a base member 48, a guide shaft 49, the slide motor 50, and a position sensor 51.

The liquid applier 31 and the crimper 32 are attached to the base member 48 such that the liquid applier 31 and the crimper 32 are adjacent to each other in the main scanning direction. The guide shaft 49 extends in the main scanning direction at a position downstream from the internal tray 22 in the conveyance direction. The guide shaft 49 supports the base member 48 slidably in the main scanning direction. The slide motor 50 generates a driving force to move the edge binding unit 25. The driving force of the slide motor 50 is transmitted to the base member 48 via a pulley and a timing belt.

As a result, the liquid applier 31 and the crimper 32 integrated by the base member 48 slide in the main scanning direction along the guide shaft 49. The positions of the liquid applier 31 and the crimper 32 may be ascertained with, for example, an encoder sensor attached to an output shaft of the slide motor 50. The position sensor 51 detects the arrival of the edge binding unit 25 at a standby position P1 (see FIG. 9A).

Figure 9A:
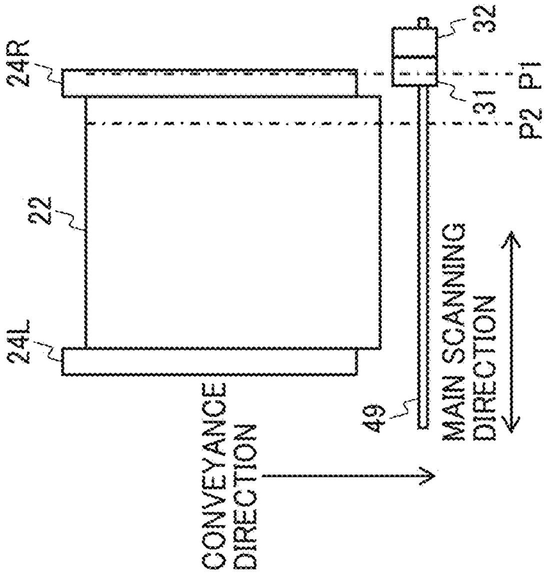
FIGS. 9A to 9C are diagrams illustrating the positions of the liquid applier and the crimper during the binding process of FIG. 8.
Figure 9B:
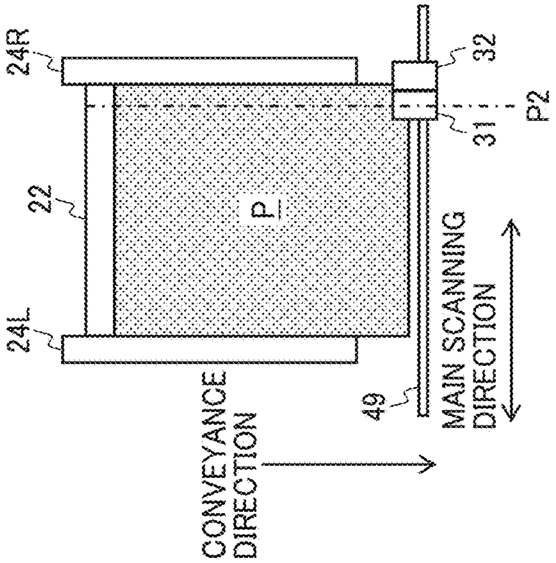
Figure 9C:
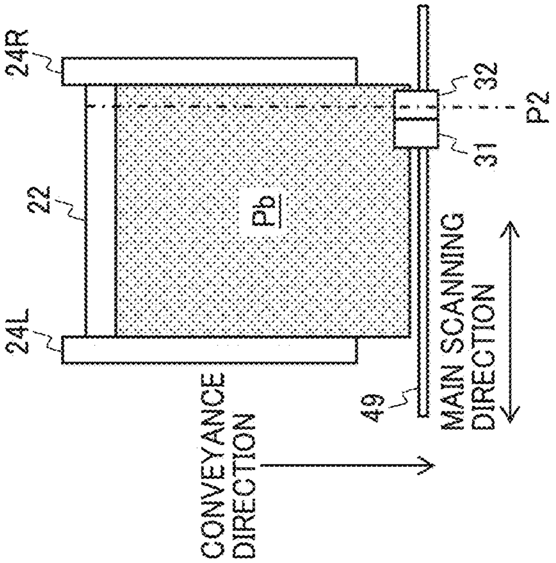

As illustrated in FIG. 9A, the standby position P1 is apart from the sheet P supported on the internal tray 22 in the width direction of the sheet P. As illustrated in FIGS. 9B and 9C, the liquid applier 31 and the crimper 32 are moved to a binding position P2 by the slide mechanism 47. At the binding position P2, the liquid applier 31 faces the sheet P or the sheet bundle Pb supported on the internal tray 22 to apply liquid to the sheet P or the sheet bundle Pb whereas the crimper 32 faces the sheet P or the sheet bundle Pb supported on the internal tray 22 to crimp and bind the sheet P or the sheet bundle Pb. In other words, the standby position P1 and the binding position P2 are apart from each other in the main scanning direction. The liquid applier 31 according to the present embodiment is adjacent to the crimper 32 and closer to the binding position P2 than the crimper 32 at the standby position P1.

As illustrated in FIG. 3, the edge binding unit 25 includes a pivot mechanism 52. The pivot mechanism 52 pivots each of the pair of binding teeth 32*b* and 32*c* and the liquid application member 44 about a pivot extending in the thickness direction of the sheet P supported on the internal tray 22 (in other words, a direction orthogonal to the conveyance direction and to the main scanning direction). The pivot mechanism 52 includes a liquid applier pivot 53, a crimper pivot 54, a coupling mechanism 55, and a pivot motor 56 (driving source).

The liquid applier pivot 53 and the crimper pivot 54 extend in the thickness direction of the sheet P supported on the internal tray 22. In other words, the liquid applier pivot 53 and the crimper pivot 54 extend parallel to each other at positions apart from each other in the main scanning direction. The liquid applier pivot 53 supports the liquid application member 44 pivotably with respect to the liquid application frame 31*a*. The crimper pivot 54 supports the crimping frame 32*a* pivotably with respect to the base member 48. The coupling mechanism 55 couples the crimping frame 32*a* and the liquid applier pivot 53 to each other.

The pivot motor 56 generates a driving force to pivot the pair of binding teeth 32*b* and 32*c* and the liquid application member 44. The driving force of the pivot motor 56 is transmitted to the crimper pivot 54 via a pulley and a timing belt. As a result, the crimping frame 32*a* is pivoted about the crimper pivot 54 together with the pair of binding teeth 32*b* and 32*c*. The rotation of the crimping frame 32*a* is transmitted to the liquid applier pivot 53 via the coupling mechanism 55. As a result, the liquid application member 44 is pivoted about the liquid applier pivot 53 with respect to the liquid application frame 31*a*.

FIGS. 6A and 6B are plan views of the edge binding unit 25. As illustrated in FIGS. 6A and 6B, the coupling mechanism 55 according to the present embodiment includes a first pulley 55*a*, a second pulley 55*b*, and an endless annular timing belt 55*c*. The first pulley 55*a* is fixed to the liquid applier pivot 53 and rotates integrally with the liquid applier pivot 53. The second pulley 55*b* is fixed to the crimping frame 32*a* on an extension of the crimper pivot 54 and rotates integrally with the crimping frame 32*a*. The timing belt 55*c* is entrained around the first pulley 55*a* and the second pulley 55*b*.

As illustrated in FIGS. 6A and 6B, the pair of binding teeth 32*b* and 32*c* and the liquid application member 44 have rectangular ends that contact the sheet P or the sheet bundle Pb. The rectangle is an example of a flat shape. However, a specific example of the flat shape is not limited to a rectangle. The flat shape may be any shape having a longitudinal direction and a lateral direction, such as a trapezoid, a parallelogram, an ellipse, or a rectangle with rounded corners. Preferably, the ends of the pair of binding teeth 32*b* and 32*c* and the liquid application member 44 have like shapes. In addition, the end of the liquid application member 44 has an area equal to or slightly smaller than the area of the ends of the pair of binding teeth 32*b* and 32*c*.

FIG. 6A illustrates a "parallel binding posture" as a first binding posture in which a longitudinal direction (in other words, a long side) of the end of each of the pair of binding teeth 32*b* and 32*c* and the liquid application member 44 coincides with or is along the main scanning direction. The parallel binding posture corresponds to a posture in which each of the pair of binding teeth 32*b* and 32*c* and the liquid application member 44 is not pivoted by the pivot mechanism 52. In other words, the parallel binding posture refers to a posture of each of the pair of binding teeth 32*b* and 32*c* and the liquid application member 44 with respect to the sheet P or the sheet bundle Pb when the sheets P are bound such that a longitudinal direction of a binding trace to be formed is along the width direction of the sheets P. In other words, after the sheets P are bound as described below by the edge binding unit 25 in the posture of FIG. 6A, a crimp binging trace elongated in the main scanning direction remains at an end of the sheet bundle Pb.

On the other hand, FIG. 6B illustrates an "oblique binding posture" as a second binding posture in which the longitudinal direction (in other words, the long side) of the end of each of the pair of binding teeth 32*b* and 32*c* and the liquid application member 44 is inclined with respect to the main scanning direction. The oblique binding posture corresponds to a posture in which each of the pair of binding teeth 32*b* and 32*c* and the liquid application member 44 is pivoted by the pivot mechanism 52. In other words, the oblique binding posture refers to a posture of each of the pair of binding teeth 32*b* and 32*c* and the liquid application member 44 with respect to the sheet P or the sheet bundle Pb when a corner of the sheet bundle Pb is bound such that a longitudinal direction of a binding trace to be formed is not along either the width direction of the sheets P or the conveyance direction of the sheets P. In other words, after the sheets P are bound as described below by the edge binding unit 25 in the posture of FIG. 6B, a crimp binging trace inclined with respect to the main scanning direction remains at an end of the sheet bundle Pb. Although FIG. 6B illustrates an embodiment in which each of the pair of binding teeth 32*b* and 32*c* and the liquid application member 44 is inclined at 45°, the inclination angle in the oblique binding posture is not limited to the aforementioned embodiment.

The pivot mechanism 52 pivots the pair of binding teeth 32*b* and 32*c* and the liquid application member 44 between the parallel binding posture illustrated in FIG. 6A and the oblique binding posture illustrated in FIG. 6B. The inclination angles of the pair of binding teeth 32*b* and 32*c* and the liquid application member 44 may be ascertained with, for example, an encoder sensor attached to an output shaft of the pivot motor 56.

In other words, the pivot mechanism 52 according to the present embodiment pivots the pair of binding teeth 32*b* and 32*c* and the liquid application member 44 in conjunction with each other with the common pivot motor 56. The pair of binding teeth 32*b* and 32*c* and the liquid application member 44 in the oblique binding posture are inclined at an identical angle with respect to the main scanning direction. The pair of binding teeth 32*b* and 32*c* and the liquid application member 44 are disposed at an identical position in the conveyance direction in each of the parallel binding posture (FIG. 6A) and the oblique binding posture (FIG. 6B).

Referring back to FIG. 2, the post-processing apparatus 3 further includes an end fence 27, a saddle binding unit 28, a sheet folding blade 29, and the output tray 30. The end fence 27, the saddle binding unit 28, and the sheet folding blade 29 perform the saddle stitching on the sheets P conveyed through the third conveyance passage Ph3. Among the sheets P supplied from the image forming apparatus 2, the sheet bundle Pb subjected to the saddle stitching is output to the output tray 30.

The end fence 27 aligns the positions, in the conveyance direction, of the sheets P sequentially conveyed through the third conveyance passage Ph3. The end fence 27 can move between a binding position where the end fence 27 causes the center of the sheet bundle Pb to face the saddle binding unit 28 and a folding position where the end fence 27 causes the center of the sheet bundle Pb to face the sheet folding blade 29. The saddle binding unit 28 binds the center of the sheet bundle Pb aligned by the end fence 27 at the binding position. The sheet folding blade 29 folds, in half, the sheet bundle Pb supported by the end fence 27 at the folding position and causes the conveyance roller pair 18 to sandwich the sheet bundle Pb. The conveyance roller pairs 18 and 19 output the sheet bundle Pb subjected to the saddle stitching to the output tray 30.

Figure 7:
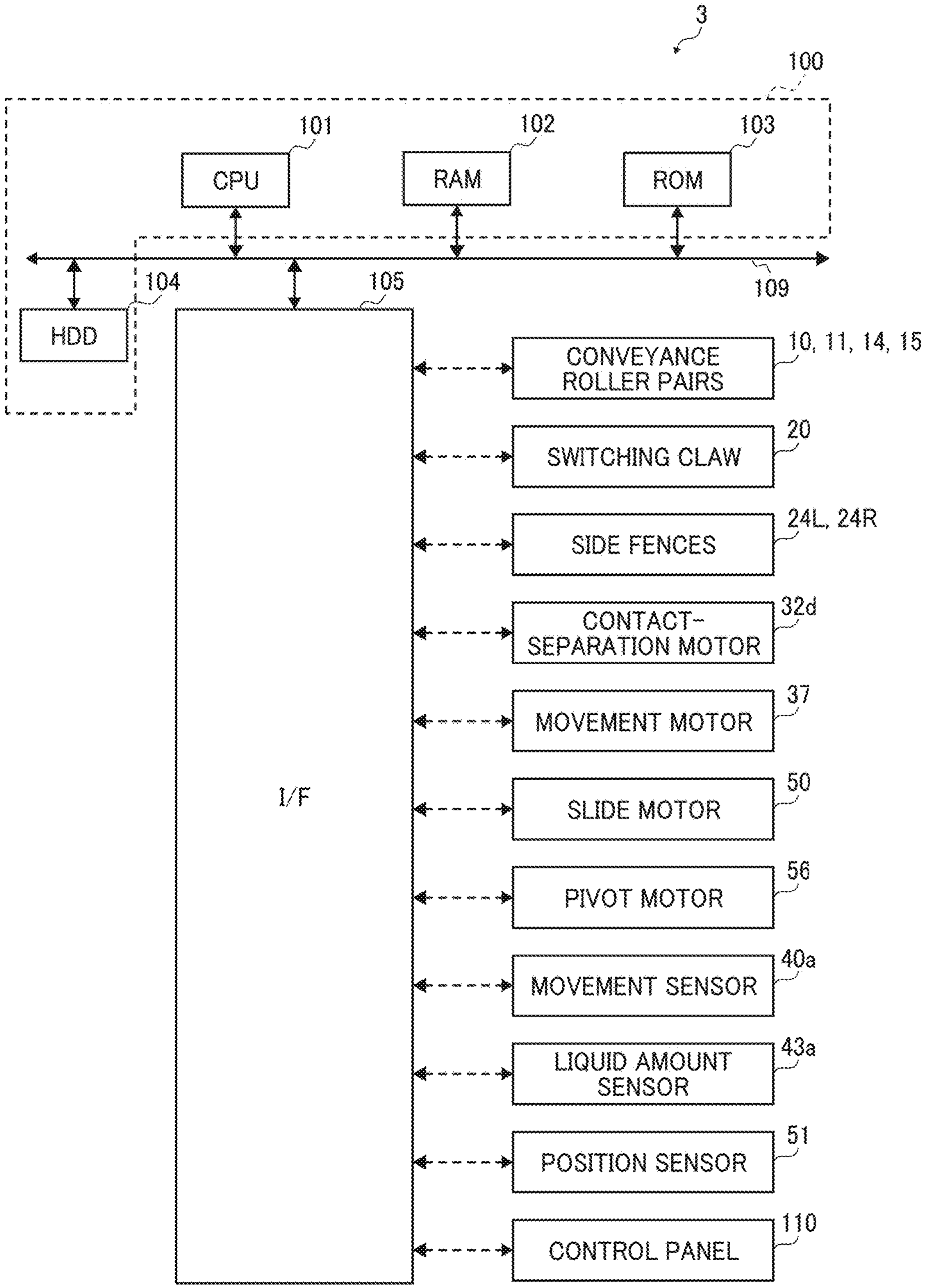
FIG. 7 is a block diagram illustrating a hardware configuration of the post-processing apparatus to control the operation of the post-processing apparatus according to the first embodiment of the present disclosure.

FIG. 7 is a block diagram illustrating a hardware configuration of the post-processing apparatus 3 to control the operation of the post-processing apparatus 3 according to the first embodiment of the present disclosure. As illustrated in FIG. 7, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, for example, an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects the conveyance roller pairs 10, 11, 14, and 15, the switching claw 20, the side fences 24L and 24R, the contact-separation motor 32*d*, the slide motor 50, the pivot motor 56, the movement sensor 40*a*, the liquid amount sensor 43*a*, the position sensor 51, and a control panel 110 to the common bus 109. The controller 100 operates, via the I/F 105, the conveyance roller pairs 10, 11, 14, and 15, the switching claw 20, the side fences 24L and 24R, the contact-separation motor 32*d*, the slide motor 50, and the pivot motor 56 to acquire detection results provided by sensors such as the movement sensor 40*a*, the liquid amount sensor 43*a*, and the position sensor 51. Although FIG. 7 illustrates the components that execute the edge stitching, the components that execute the saddle stitching are controlled by the controller 100 like the components that execute the edge stitching.

As illustrated in FIG. 1, the image forming apparatus 2 includes the control panel 110. The control panel 110 includes an operation unit that receives instructions from a user and a display (notification unit) that notifies the user of information. The operation unit includes, for example, hard keys and a touch panel superimposed on a display. The control panel 110 acquires information from the user through the operation unit and provides information to the user through the display. Note that a specific example of the notification unit is not limited to the display and may be a light emitting diode (LED) lamp or a speaker. The post-processing apparatus 3 may include the control panel 110 like the control panel 110 described above.

Figure 8:
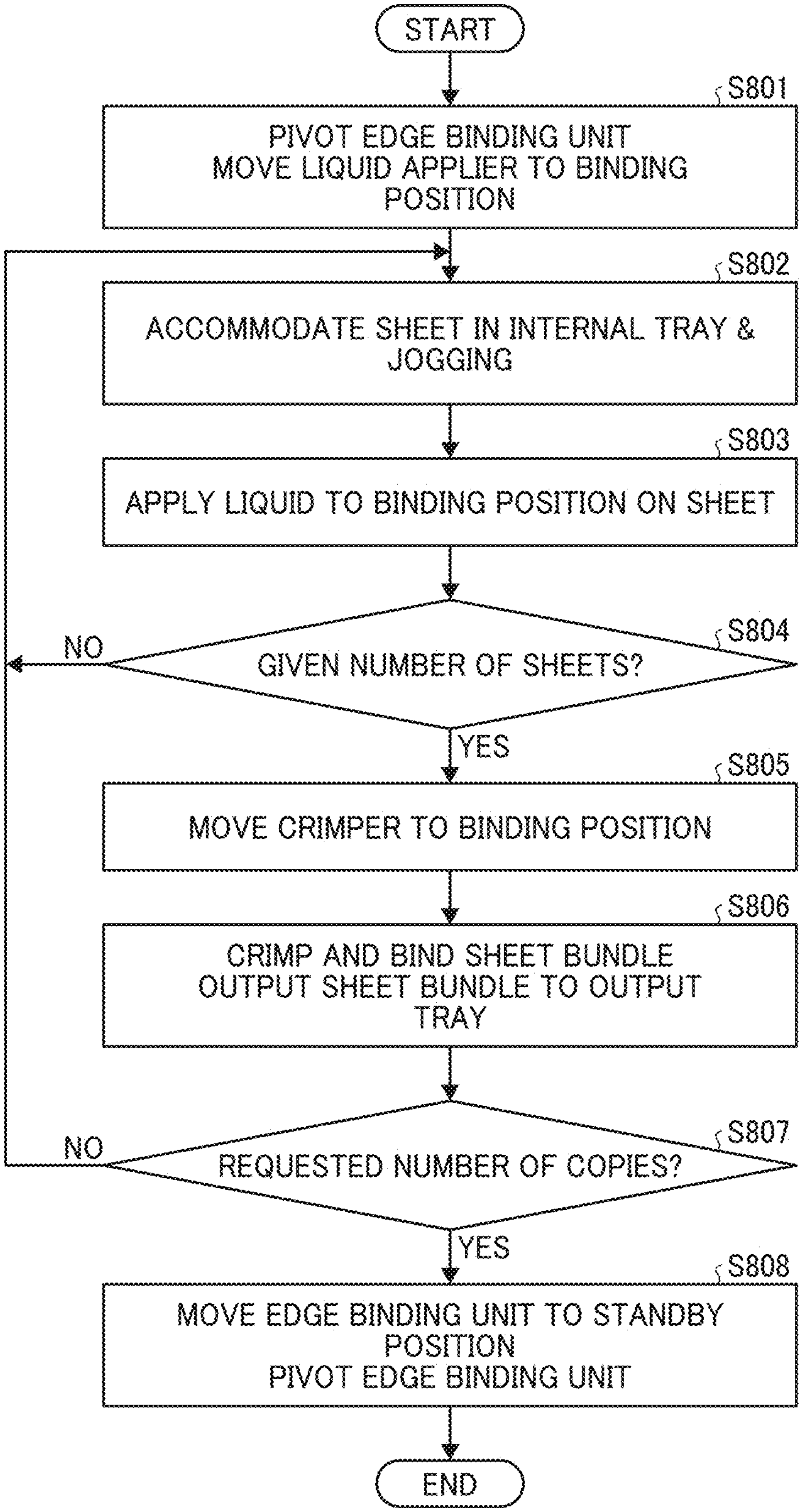
FIG. 8 is a flowchart of a binding process.

FIG. 8 is a flowchart of a binding process. FIGS. 9A to 9C are diagrams illustrating the positions of the liquid applier 31 and the crimper 32 during the binding process. Note that FIGS. 9A to 9C do not illustrate the postures of the liquid applier 31 and the crimper 32. For example, the controller 100 starts the binding process illustrated in FIG. 8 when the controller 100 acquires an instruction to execute the binding process from the image forming apparatus 2. In the following description, the instruction to execute the binding process may be referred to as a "binding command."

The binding command includes, for example, the number of sheets P of the sheet bundle Pb, the number of sheet bundles Pb to be bound, the binding position on the sheet bundle Pb, and a binding posture of the edge binding unit 25. In the following description, the number of sheets P of the sheet bundle Pb may be referred to as "given number of sheets" whereas the number of sheet bundles Pb to be bound may be referred to as "requested number of copies." The liquid applier 31 and the crimper 32 are disposed at the standby position P1 (FIG. 9A) in the parallel binding posture (FIG. 6A) at the start of the binding process.

First, in step S801, the controller 100 drives the pivot motor 56 to pivot the liquid applier 31 and the crimper 32 into the oblique binding posture when the posture instructed by the binding command is the "oblique binding posture." This operation is omitted when the posture instructed by the binding command is the "parallel binding posture." In step S801, the controller 100 also drives the slide motor 50 to cause the edge binding unit 25 to slide in the main scanning direction so that the liquid applier 31 faces the binding position P2 instructed by the binding command. Note that the controller 100 executes the operation of step S801 before a first sheet P is conveyed to the internal tray 22 by the conveyance roller pairs 10, 11, 14, and 15.

Next, in step S802, the controller 100 rotates the conveyance roller pairs 10, 11, 14, and 15 to place the sheet P on which an image is formed by the image forming apparatus 2 in the internal tray 22. The controller 100 also moves the side fences 24L and 24R to align the position of the sheet P supported on the internal tray 22 in the main scanning direction. In short, the controller 100 performs so-called jogging.

Next, in step S803, the controller 100 causes the liquid applier 31 at the binding position P2 to apply liquid to the sheet P, which is supported on the internal tray 22 in step S802 immediately before step S803. In other words, the controller 100 drives the movement motor 37 to cause the liquid application member 44 to contact the binding position P2 on the sheet P supported on the internal tray 22.

Referring back to FIG. 8, in step S804, the controller 100 determines whether or not the number of sheets P placed on the internal tray 22 has reached the given number of sheets instructed by the binding command. When the controller 100 determines that the number of sheets P placed on the internal tray 22 has not reached the given number of sheets (NO in step S804), the controller 100 executes the operations of steps S802 and 803 again. In other words, the controller 100 executes the operations of steps S802 and 803 each time the sheet P is conveyed to the internal tray 22 by the conveyance roller pairs 10, 11, 14, and 15. Note that the liquid applier 31 may apply liquid to all or some of the sheets P of the sheet bundle Pb.

By contrast, when the controller 100 determines that the number of sheets P placed on the internal tray 22 has reached the given number of sheets (YES in step S804), in step S805, the controller 100 drives the slide motor 50 to cause the edge binding unit 25 to slide in the main scanning direction so that the crimper 32 faces the binding position P2 as illustrated in FIG. 9C.

Next, in step S806, the controller 100 crimps and binds the sheet bundle Pb placed on the internal tray 22 and outputs the sheet bundle Pb to the output tray 26. Specifically, the controller 100 drives the contact-separation motor 32*d* to cause the pair of binding teeth 32*b* and 32*c* to sandwich the binding position P2 on the sheet bundle Pb supported on the internal tray 22. The controller 100 then rotates the conveyance roller pair 15 to output the sheet bundle Pb thus crimped and bound to the output tray 26.

The sheet bundle Pb supported on the internal tray 22 has a crimping area sandwiched by the pair of binding teeth 32*b* and 32*c* in step S806. The crimping area overlaps a liquid application area that the end of the liquid application member 44 contacts in step S803. In other words, the crimper 32 crimps and binds an inside of an area to which the liquid is applied by the liquid applier 31 on the sheet bundle Pb supported on the internal tray 22. The crimping area sandwiched by the pair of binding teeth 32*b* and 32*c* may completely or partially overlaps the liquid application area contacted by the end of the liquid application member 44 to obtain a sufficient binding strength.

In step S807, the controller 100 determines whether or not the number of sheet bundles Pb thus output has reached the requested number of copies indicated by the binding command. When the controller 100 determines that the number of sheet bundles Pb thus output has not reached the requested number of copies (NO in step S807), the controller 100 executes the operations of step S802 and the following steps again. In other words, the controller 100 repeatedly executes the operations of steps S802 to S806 until the number of sheet bundles Pb output to the output tray 26 reaches the requested number of copies (YES in step S807).

When the controller 100 determines that the number of sheet bundles thus output has reached the requested number of copies (YES in step S807), in step S808, the controller 100 drives the slide motor 50 to cause the edge binding unit 25 to slide to the standby position P1. In step S808, the controller 100 also drives the pivot motor 56 to pivot the liquid applier 31 and the crimper 32 into the parallel binding posture when the posture instructed by the binding command is the "oblique binding posture." This operation is omitted when the posture instructed by the binding command is the "parallel binding posture." As a result, the liquid applier 31 and the crimper 32 return to the positions illustrated in FIG. 9A. Note that, in steps S801 and S808, the execution order of the sliding and the rotation of the liquid applier 31 and the crimper 32 is not limited to the above-described order and may be reversed.

A description is now given of some or all of advantages according to the embodiment described above, enumeration of which is not exhaustive or limiting.

According to the embodiment described above, since the posture of the liquid application member 44 is changed according to the posture of the pair of binding teeth 32*b* and 32*c*, the liquid is applied to a limited range on the sheet P. As a result, wrinkles on the sheet P are prevented while an image formed on the sheet P is prevented from being blurred.

According to the embodiment described above, the pair of binding teeth 32*b* and 32*c* and the liquid application member 44 are inclined at an identical angle in the oblique binding posture and are disposed at an identical position in the conveyance direction in each of the parallel binding posture and the oblique binding posture. Accordingly, an inside of the area to which the liquid is applied on the sheet bundle Pb is crimped and bound without a special alignment.

According to the embodiment described above, since the pair of binding teeth 32*b* and 32*c* and the liquid application member 44 are pivoted in conjunction with each other by the driving force of the common pivot motor 56, the crimping area overlaps the liquid application area in a simple configuration. In other words, the pivot mechanism 52 according to the embodiment described above serves as both a liquid-applier pivot mechanism that pivots the liquid applier 31 and a crimper pivot mechanism that pivots the crimper 32.

Figure 10:
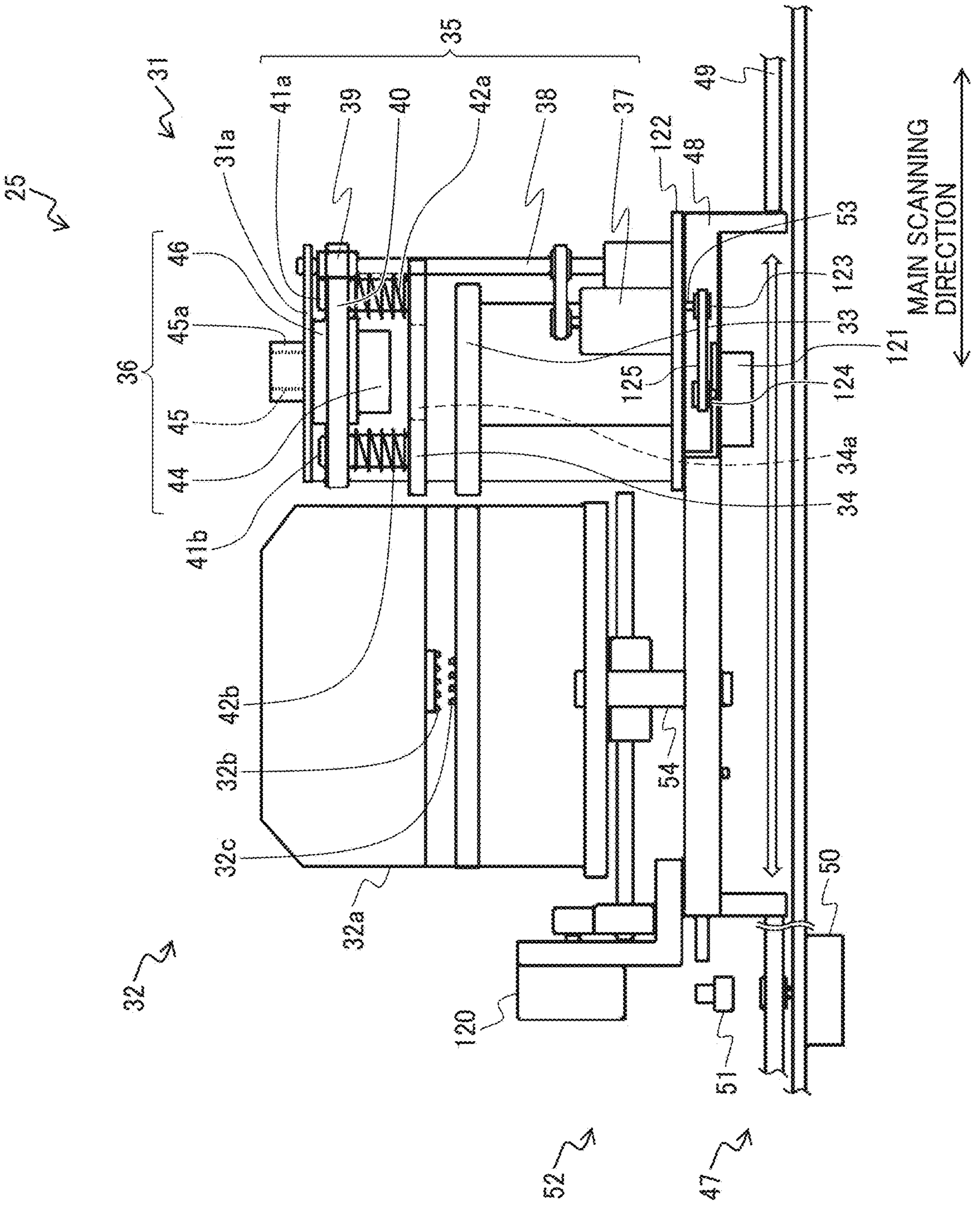
FIG. 10 is a diagram illustrating the crimper and the liquid applier each being provided with a driving source.

However, a driving source for pivoting the pair of binding teeth 32*b* and 32*c* may be disposed separately from a driving source for pivoting the liquid application member 44. Specifically, as illustrated in FIG. 10, a crimper pivot driving motor 120 that drives and rotates the crimper 32 may be disposed separately from a liquid applier pivot driving motor 121 that drives and rotates the liquid applier 31.

The crimper pivot driving motor 120 generates a driving force to pivot the crimper 32. The driving force is transmitted to the crimper pivot 54 via a pulley and a timing belt. As a result, the crimper 32 is pivoted about the crimper pivot 54 together with the pair of binding teeth 32*b* and 32*c*. According to the present embodiment, the crimper pivot driving motor 120, the pulley, and the timing belt are included in the crimper pivot mechanism that pivots the crimper 32.

The liquid applier pivot driving motor 121 generates a driving force to pivot the liquid applier 31. The components of the liquid applier 31 are supported and unitized by the liquid application frame 31*a* and a liquid application base member 122, thus being disposed on the base member 48. The liquid applier pivot 53 provided with a pulley 123 is disposed integrally with a lower end of the liquid application base member 122. An output shaft of the liquid applier pivot driving motor 121 is provided with a pulley 124. As the pulley 123 and the pulley 124 are coupled to each other by a timing belt 125, the driving force of the liquid applier pivot driving motor 121 is transmitted to the liquid applier pivot 53. As a result, the liquid applier 31 is pivoted about the liquid applier pivot 53 on the base member 48 together with the liquid application member 44. According to the present embodiment, the liquid applier pivot driving motor 121, the pulleys 123 and 124, and the timing belt 125 are included in the liquid-applier pivot mechanism that pivots the liquid applier 31.

According to the embodiment described above, since the liquid application member 44 is pivoted alone, independently from the liquid application frame 31*a*, the pivot motor 56 is downsized as compared with a pivot motor that is used to pivot the entire liquid application frame 31*a*. Alternatively, as illustrated in FIG. 11A, the entire liquid application frame 31*a* may be pivoted integrally with the liquid application member 44. In another embodiment, the pair of binding teeth 32*b* and 32*c* may be pivoted independently from the crimping frame 32*a*.

In a case where the liquid application member 44 is pivoted independently from the liquid application frame 31*a* and the entire crimping frame 32*a* is pivoted together with the pair of binding teeth 32*b* and 32*c* as in the embodiment described above, if the liquid applier 31 is disposed closer to the standby position P1 than the crimper 32, an increased space may be needed in the main scanning direction in the post-processing apparatus 3. To save space, the liquid applier 31 is disposed closer to the binding position P2 than the crimper 32.

In the embodiment described above, the postures of the pair of binding teeth 32*b* and 32*c* and the liquid application member 44 change to two postures: the parallel binding posture and the oblique binding posture. However, the postures of the pair of binding teeth 32*b* and 32*c* and the liquid application member 44 are not limited to the two postures. Alternatively, as illustrated in FIG. 11B, the postures of the pair of binding teeth 32*b* and 32*c* and the liquid application member 44 may change to a "vertical binding posture" as a third binding posture in which the longitudinal direction (in other words, the long side) of the end of each of the pair of binding teeth 32*b* and 32*c* and the liquid application member 44 is orthogonal to the main scanning direction. The vertical binding posture corresponds to a posture in which each of the pair of binding teeth 32*b* and 32*c* and the liquid application member 44 is pivoted by the pivot mechanism 52 to a position where each of the pair of binding teeth 32*b* and 32*c* and the liquid application member 44 is along an end in the width direction of the sheet P. In other words, the vertical binding posture refers to a posture of each of the pair of binding teeth 32*b* and 32*c* and the liquid application member 44 with respect to the sheet P or the sheet bundle Pb when the sheets P are bound such that a longitudinal direction of a binding trace to be formed is along an end in the width direction of the sheets P. The pivot mechanism 52 may pivot the pair of binding teeth 32*b* and 32*c* and the liquid application member 44 at an angle between the parallel binding posture and the vertical binding posture.

In the embodiment described above, the coupling mechanism 55 includes the first pulley 55*a*, the second pulley 55*b*, and the endless annular timing belt 55*c*. However, a specific example of the coupling mechanism 55 is not limited to the embodiment illustrated in FIGS. 6A and 6B.

Figure 12A:
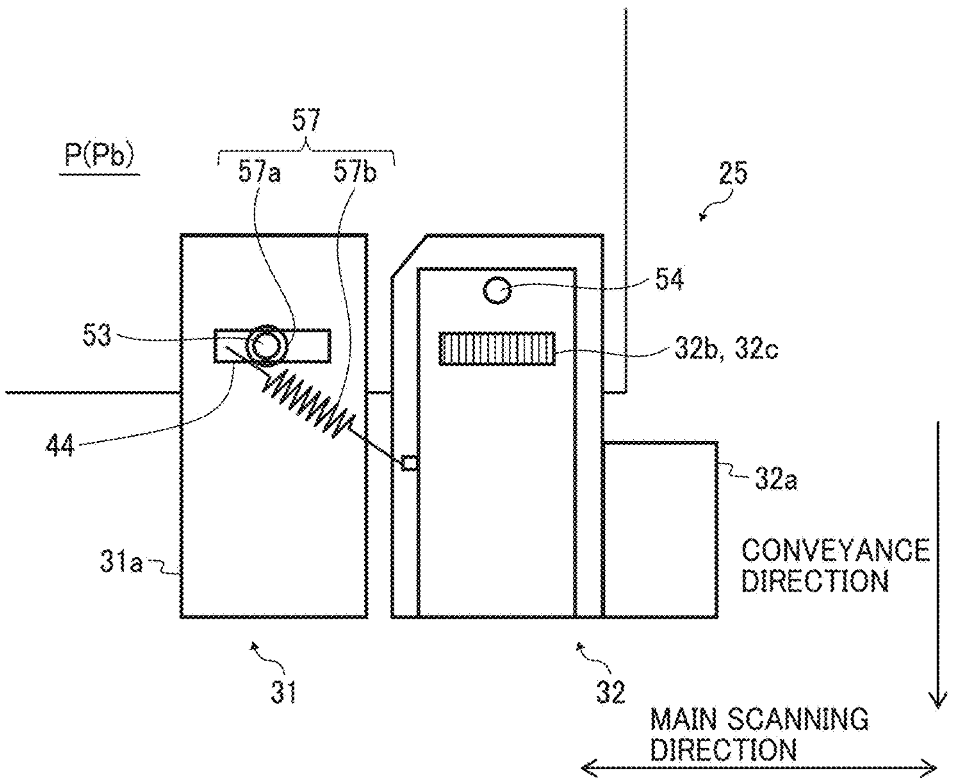
FIGS. 12A and 12B are diagrams illustrating a coupling mechanism according to a first modification of the above embodiment of the present disclosure.
Figure 12B:
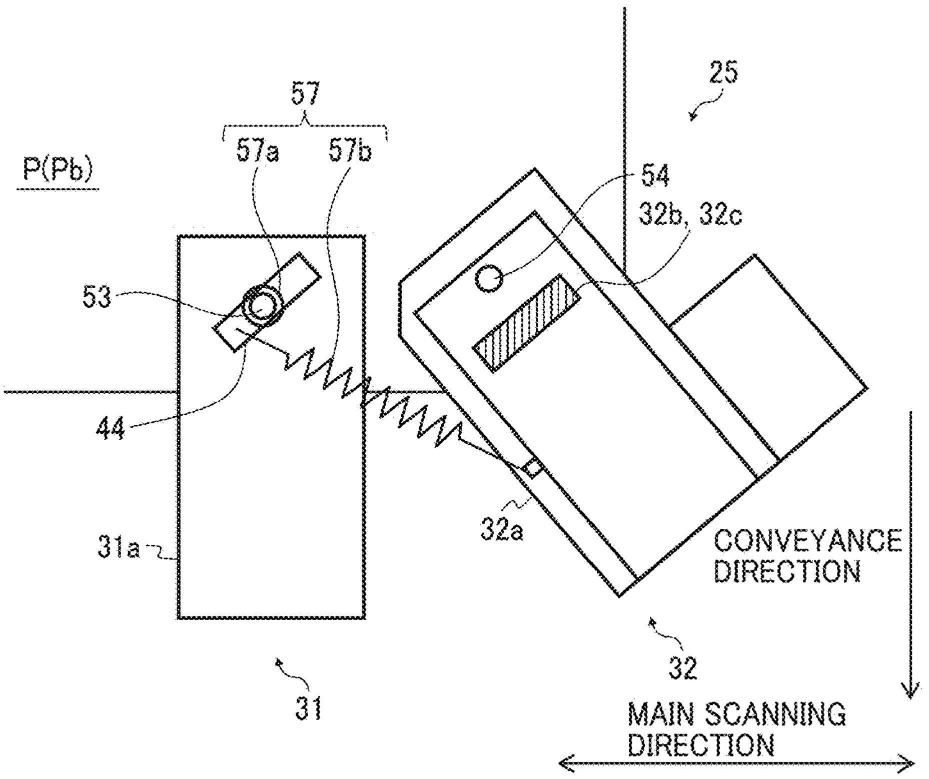

Alternatively, as illustrated in FIGS. 12A and 12B, a coupling mechanism 57 according to a first modification of the present embodiment includes a torsion coil spring 57*a* and a coil spring 57*b*. The torsion coil spring 57*a* biases the liquid application member 44 into the parallel binding posture. The coil spring 57*b* couples the crimping frame 32*a* and the liquid application member 44 to each other.

As illustrated in FIG. 12A, when the pair of binding teeth 32*b* and 32*c* and the liquid application member 44 are in the parallel binding posture, the coil spring 57*b* has a natural length. As illustrated in FIG. 12B, when the crimping frame 32*a* is pivoted toward the oblique binding posture, the coil spring 57*b* expands and pivots the liquid application member 44 toward the oblique binding posture against a biasing force of the torsion coil spring 57*a*. When the crimping frame 32*a* is then pivoted toward the parallel binding posture, the coil spring 57*b* contracts and pivots the liquid application member 44 toward the parallel binding posture with the biasing force of the torsion coil spring 57*a*.

Figure 13A:
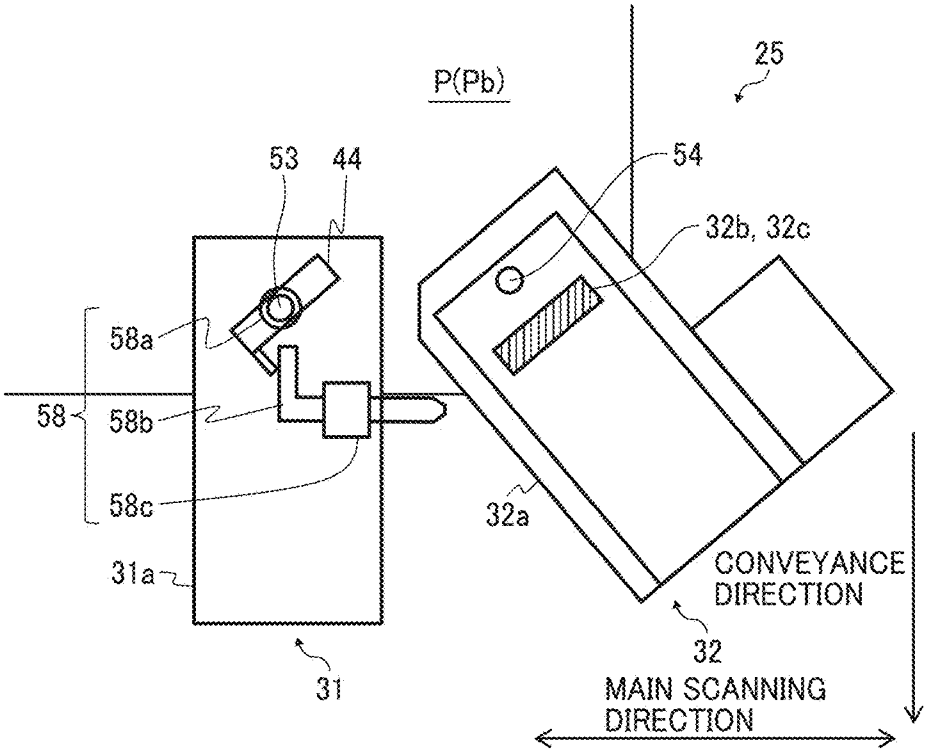
FIGS. 13A and 13B are diagrams illustrating a coupling mechanism according to a second modification of the above embodiment of the present disclosure.
Figure 13B:
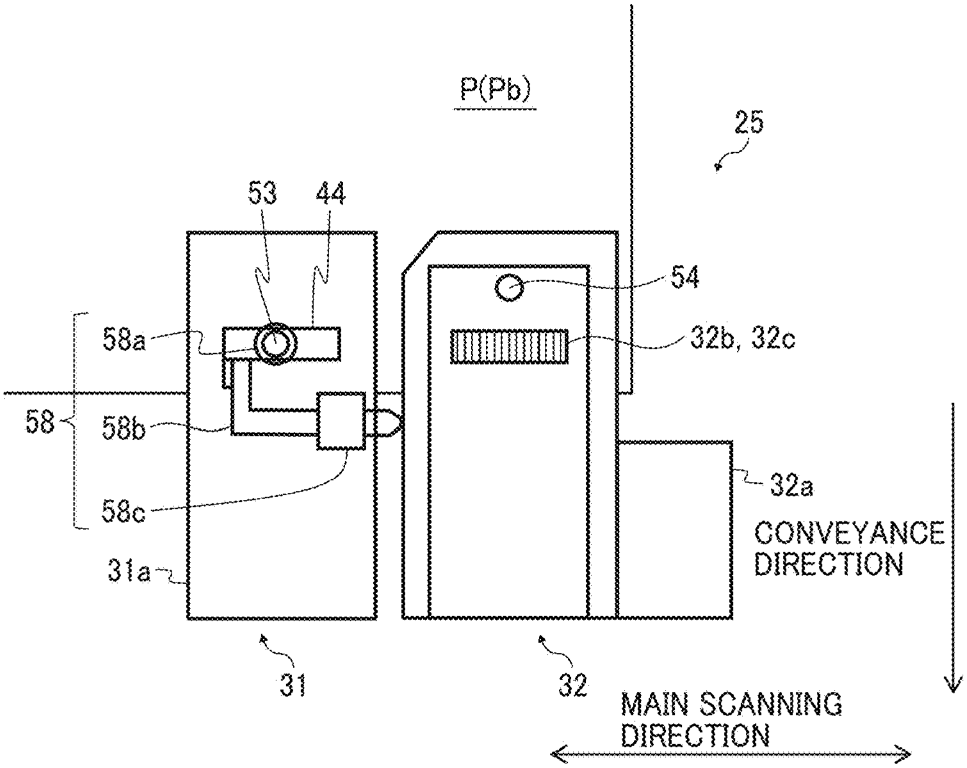

Alternatively, as illustrated in FIGS. 13A and 13B, a coupling mechanism 58 according to a second modification of the present embodiment includes a torsion coil spring 58*a*, a link member 58*b*, and a guide member 58*c*. The torsion coil spring 58*a* biases the liquid application member 44 into the oblique binding posture. The link member 58*b* is disposed between the crimping frame 32*a* and the liquid application member 44. The guide member 58*c* guides the movement of the link member 58*b* in the main scanning direction.

As illustrated in FIG. 13A, when the pair of binding teeth 32*b* and 32*c* are in the oblique binding posture, the crimping frame 32*a* is apart from the link member 58*b*. At this time, the liquid application member 44 is pivoted into the oblique binding posture by a biasing force of the torsion coil spring 58*a* and pushes the link member 58*b* toward the crimping frame 32*a*. As illustrated in FIG. 13B, when the crimping frame 32*a* is pivoted toward the parallel binding posture, the link member 58*b* pushed by the crimping frame 32*a* pivots the liquid application member 44 into the parallel binding posture against the biasing force of the torsion coil spring 58*a*.

Figure 14:
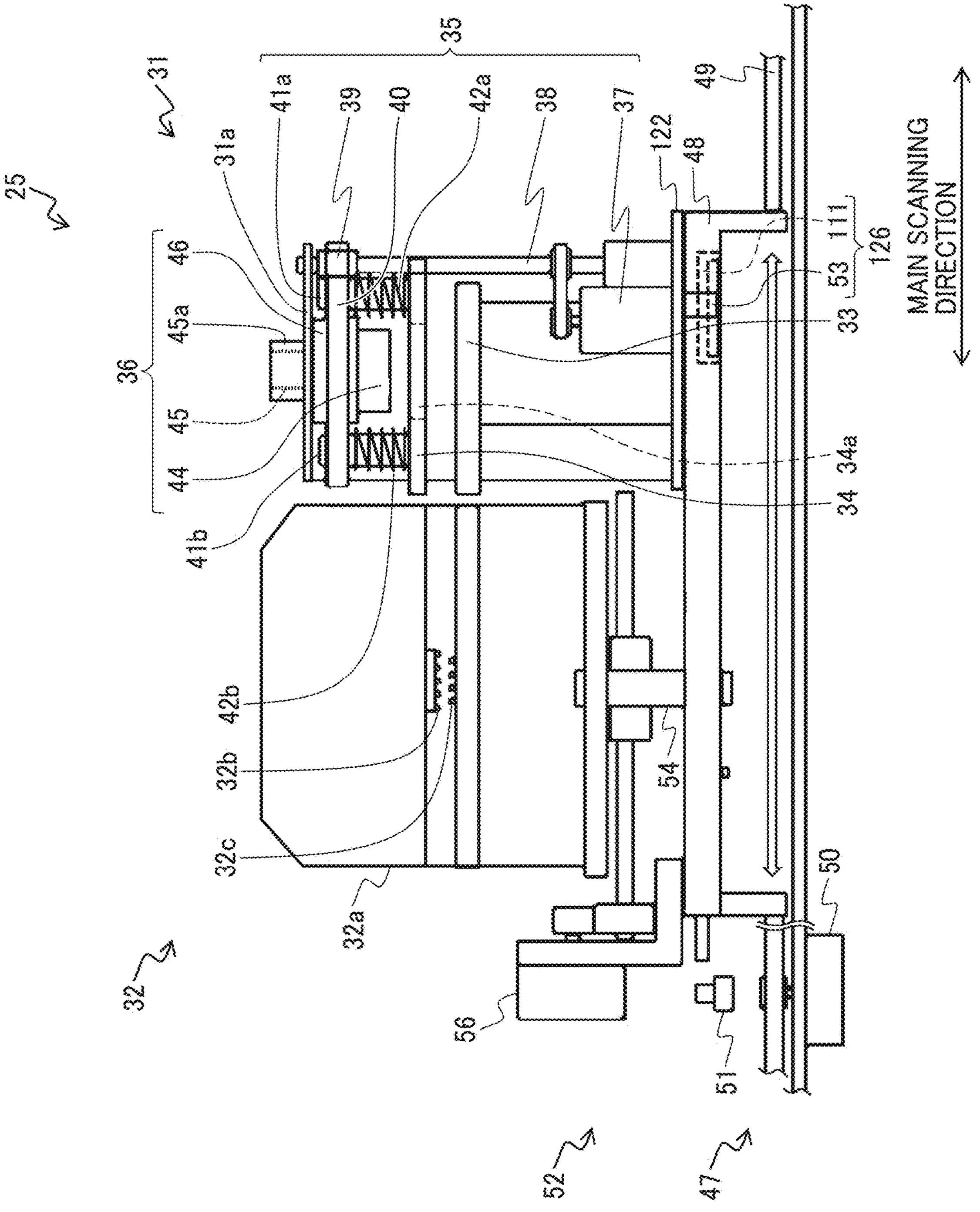
FIG. 14 is a diagram illustrating an edge binding unit according to another embodiment of the present disclosure.

FIG. 14 is an overall view of the edge binding unit 25 illustrated in FIG. 3, according to another embodiment of the present disclosure. As illustrated in FIG. 14, the crimper 32 includes the pivot mechanism 52. The pivot mechanism 52 pivots the crimper 32 that includes the pair of binding teeth 32*b* and 32*c* about the crimper pivot 54 extending in the thickness direction of the sheet P supported on the internal tray 22. The pivot mechanism 52 includes the crimper pivot 54 and the pivot motor 56. The liquid applier 31 is pivotable about the liquid applier pivot 53 extending in the thickness direction of the sheet P supported on the internal tray 22. A posture switching lever 111, which is a component of a liquid-applier pivot mechanism 126 described later, is integrally attached to the liquid applier pivot 53.

The liquid applier pivot 53 and the crimper pivot 54 extend parallel to each other at positions apart from each other in the main scanning direction. The liquid applier pivot 53 supports the liquid application frame 31*a* and the liquid application base member 122 pivotably with respect to the base member 48. The crimper pivot 54 supports the crimping frame 32*a* pivotably with respect to the base member 48.

The pivot motor 56 generates a driving force to pivot the crimper 32. The driving force of the pivot motor 56 is transmitted to the crimper pivot 54 via the pulley and the timing belt. As a result, the crimping frame 32*a* is pivoted about the crimper pivot 54 together with the pair of binding teeth 32*b* and 32*c*.

Figure 15:
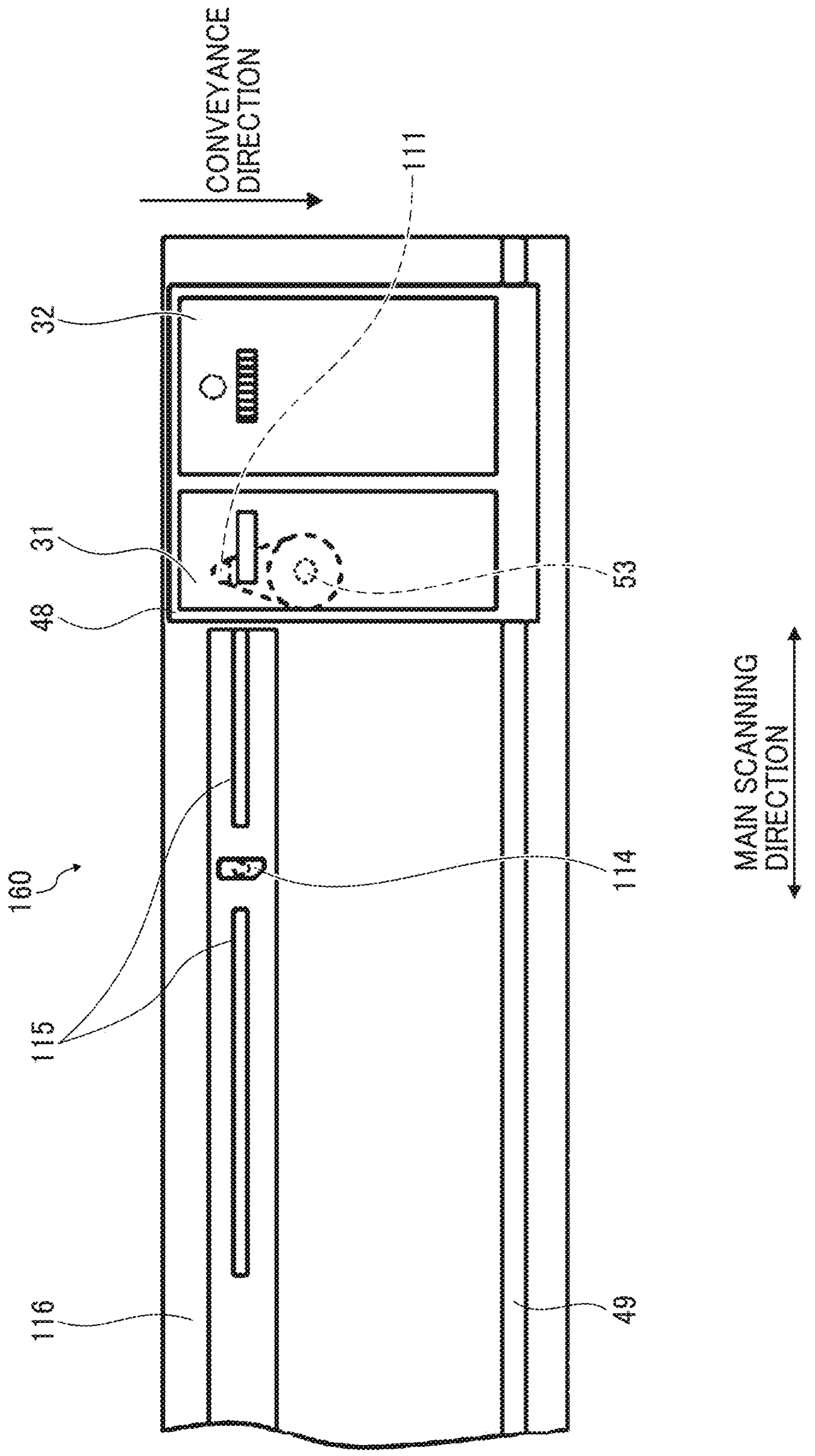
FIG. 15 is a diagram illustrating a configuration of a liquid-applier pivot mechanism.
Figure 16:
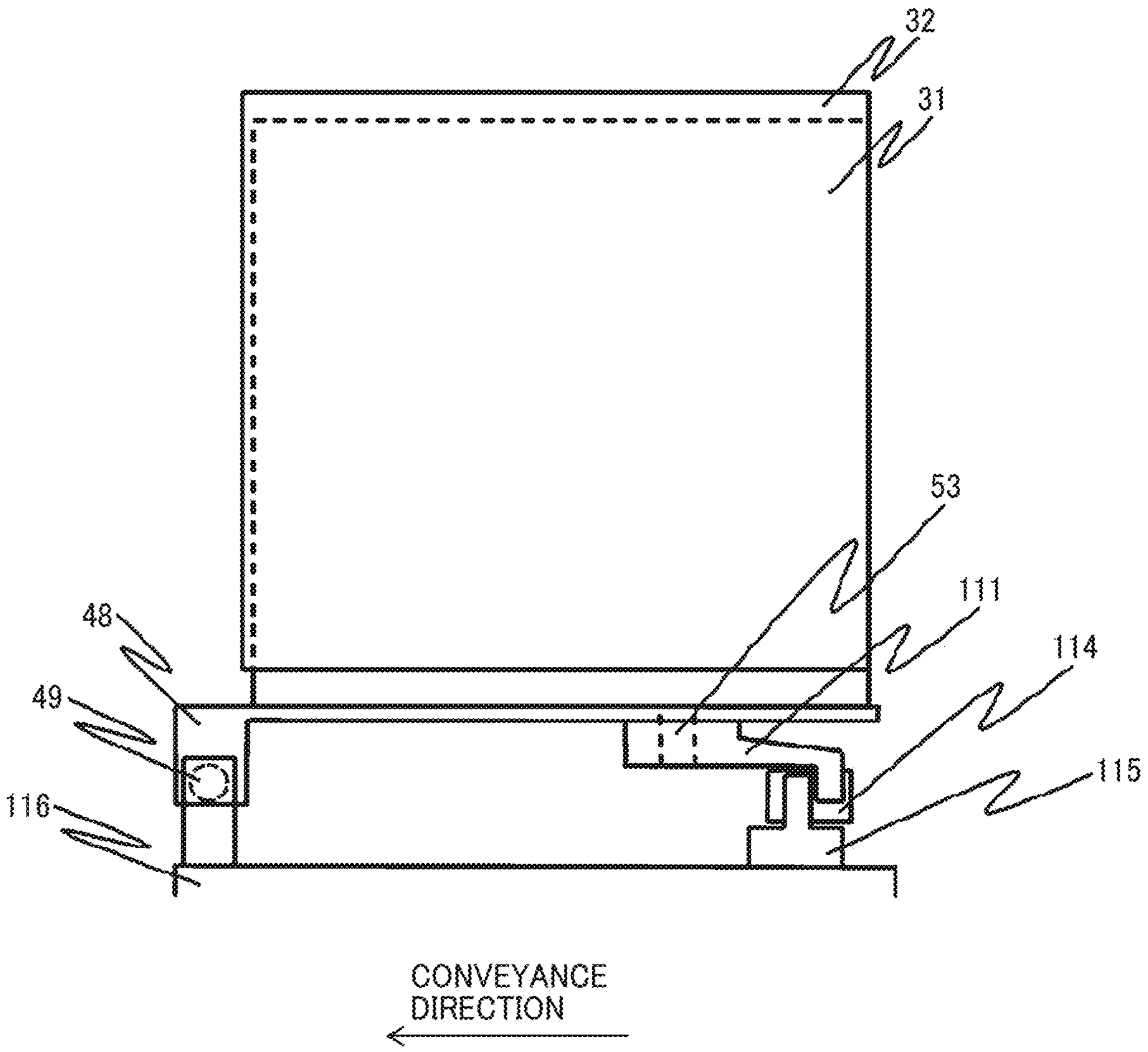
FIG. 16 is another diagram illustrating the configuration of the liquid-applier pivot mechanism.

FIGS. 15 and 16 are diagrams illustrating the liquid-applier pivot mechanism 126 that pivots the liquid applier 31 described above. The liquid-applier pivot mechanism 126 includes the liquid applier pivot 53 and the posture switching lever 111 that is pivotable integrally with the liquid applier pivot 53. The crimper 32 and the liquid applier 31 are supported by the base member 48. The slide motor 50 moves the base member 48 on a binding mechanism base 116 along the guide shaft 49 in the main scanning direction. The binding mechanism base 116 is provided with a posture switching claw 114 and a guide rail 115. The posture switching claw 114 is pivotably attached to the binding mechanism base 116 to rotate the posture switching lever 111 when the liquid applier 31 is moved in the main scanning direction by the slide motor 50 via the base member 48.

According to the present embodiment, the posture switching lever 111, the posture switching claw 114, and the guide rail 115 are included in a posture switching mechanism 160 that switches the posture of the liquid applier 31 along with the movement of the liquid applier 31 in the main scanning direction. According to the present embodiment, the posture switching lever 111 serves as a posture switching member that rotates integrally with the liquid applier 31. The posture switching claw 114 and the guide rail 115 serve as posture switchers that contact the posture switching lever 111 and switch the posture of the posture switching lever 111 when the liquid applier 31 moves in the main scanning direction.

Figure 17A:
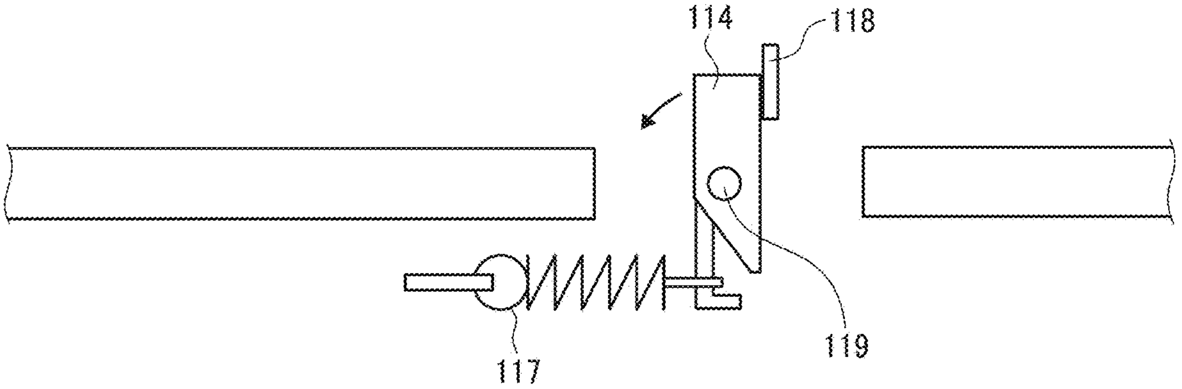
FIGS. 17A and 17B are diagrams illustrating a configuration of a posture switching claw.
Figure 17B:
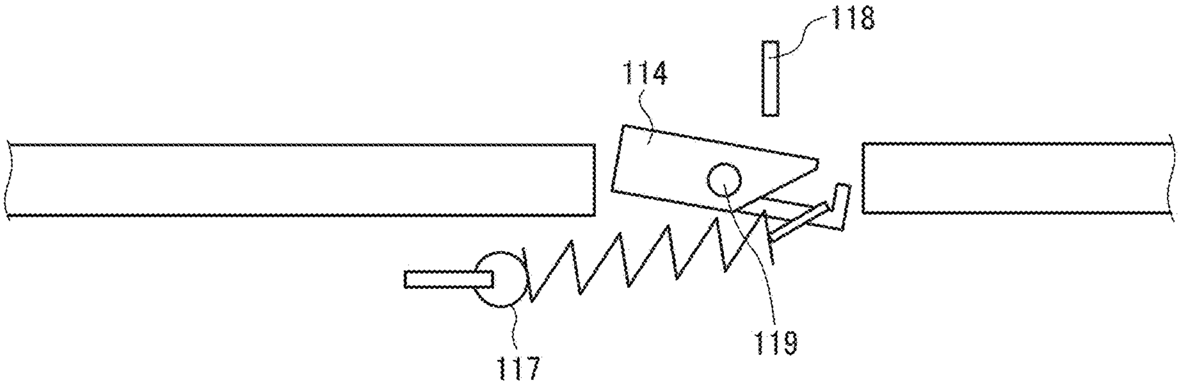
Figure 18A:
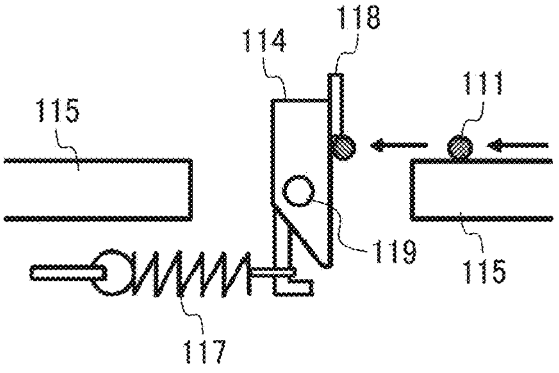
FIGS. 18A to 18F are diagrams illustrating a posture switching lever moved by the posture switching claw.
Figure 18B:
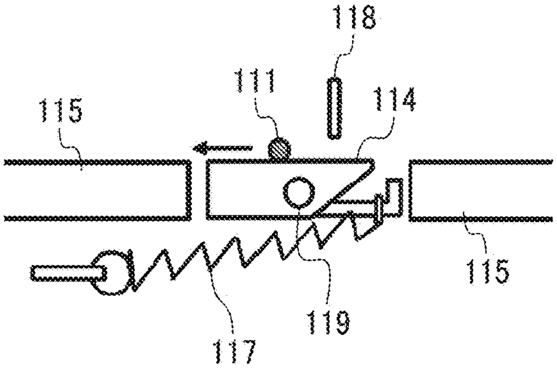
Figure 18C:
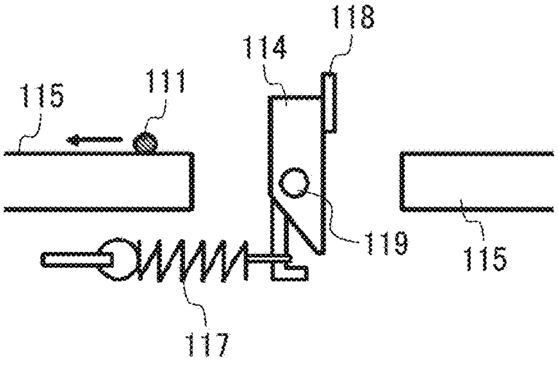
Figure 18D:
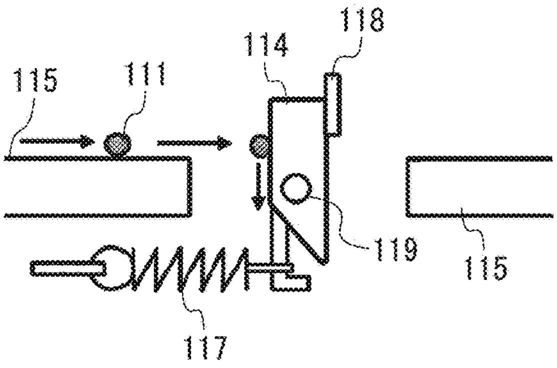
Figure 18E:
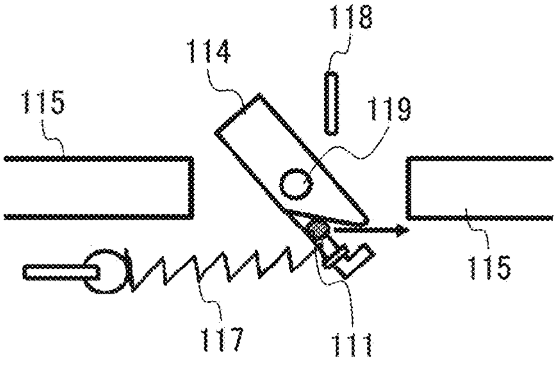
Figure 18F:
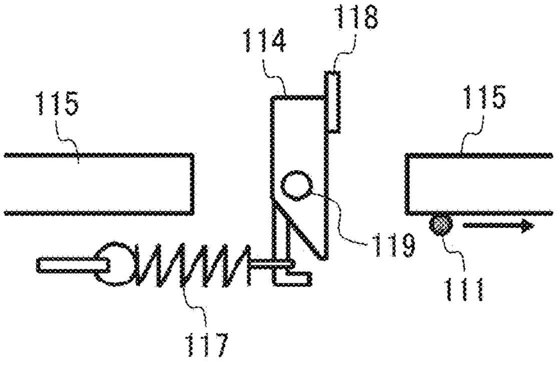

FIGS. 17A and 17B are diagrams illustrating a configuration of the posture switching claw 114 disposed on the binding mechanism base 116. FIGS. 18A to 18F are diagrams illustrating the posture switching lever 111 moved by the posture switching claw 114.

The posture switching claw 114 is pivotably held by a posture switching claw shaft 119 disposed on the binding mechanism base 116. The posture switching claw 114 is biased in a direction (specifically, a clockwise direction of the posture switching claw shaft 119 in FIGS. 17A and 17B) by a biasing spring 117 having one end attached to the binding mechanism base 116 and another end attached to the posture switching claw 114. The binding mechanism base 116 is provided with a claw stopper 118. As illustrated in FIG. 17A, the clockwise rotation of the posture switching claw 114 is restrained whereas the counterclockwise rotation of the posture switching claw 114 is allowed.

FIGS. 19A to 19H are diagrams illustrating an operation procedure for changing the posture of the crimper 32 and the liquid applier 31 to the "oblique binding posture."

Figure 19A:
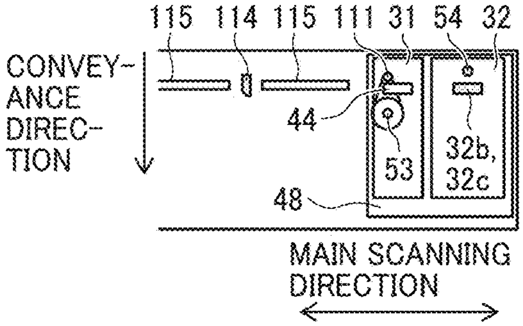
FIGS. 19A to 19H are diagrams illustrating the posture of the crimper and the liquid applier changing to an "oblique binding posture."
Figure 19B:
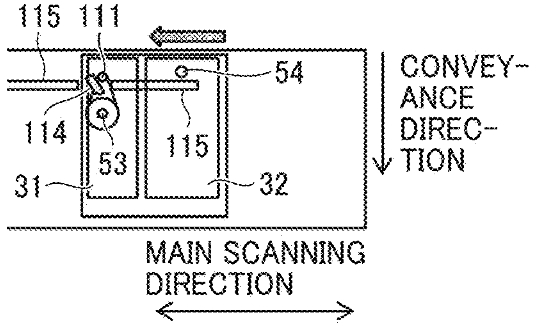

As illustrated in FIG. 19A, the crimper 32 and the liquid applier 31 is at a home position outside a sheet width area. The posture switching lever 111 is above the guide rail 115. Next, as illustrated in FIG. 19B, the crimper 32 and the liquid applier 31 move leftward while pushing open the posture switching claw 114.

To change the posture of the crimper 32 and the liquid applier 31 to the oblique binding posture, the slide motor 50 is driven to move the base member 48 holding the crimper 32 and the liquid applier 31 leftward. Since the counterclockwise rotation of the posture switching claw 114 is not restrained, the posture switching lever 111 moves over the posture switching claw 114 while pushing the posture switching claw 114 (see FIGS. 18A and 18B).

Figure 19C:
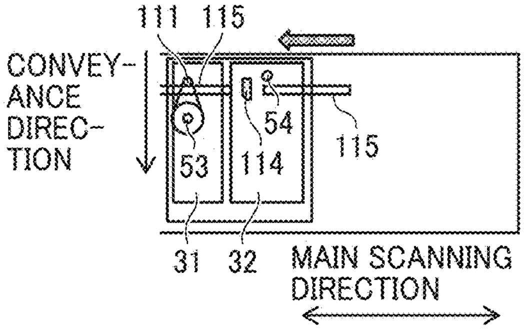

Next, as illustrated in FIG. 19C, when the posture switching lever 111 completely passes by the posture switching claw 114, the driving of the slide motor 50 is stopped to temporarily stop the leftward movement of the base member 48 along the main scanning direction. At this time, the posture switching claw 114 is biased by the biasing spring 117 and returns to a pivot restraining posture (see FIG. 18C).

Figure 19D:
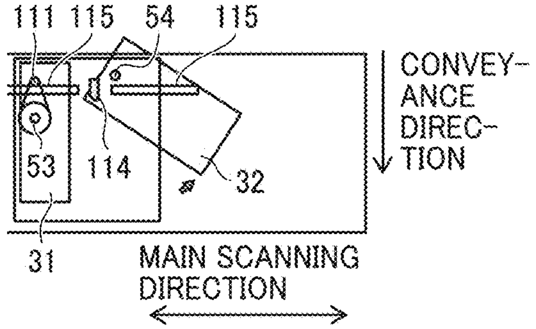

Next, as illustrated in FIG. 19D, the pivot motor 56 generates the driving force to pivot the crimper 32. The driving force of the pivot motor 56 is transmitted to the crimper pivot 54 via the pulley and the timing belt. As a result, the crimping frame 32*a* is pivoted about the crimper pivot 54 together with the pair of binding teeth 32*b* and 32*c*. As a result, the posture of the crimper 32 changes to the oblique binding posture.

Figure 19E:
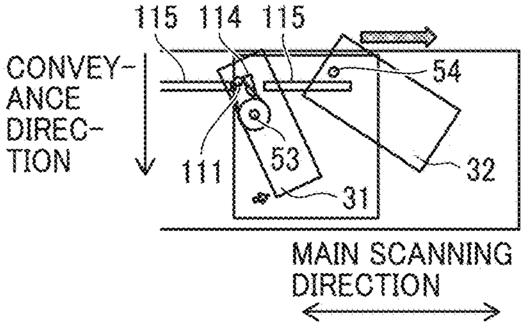

Next, as illustrated in FIG. 19E, the base member 48 holding the crimper 32 and the liquid applier 31 moves rightward along the main scanning direction. When the posture switching lever 111 contacts the posture switching claw 114, the posture switching lever 111 starts rotating toward the oblique binding posture (see FIGS. 18D and 18E) because the restrained clockwise rotation of the posture switching claw 114 hampers the rightward movement of the posture switching lever 111 along the rightward movement of the base member 48.

Figure 19F:
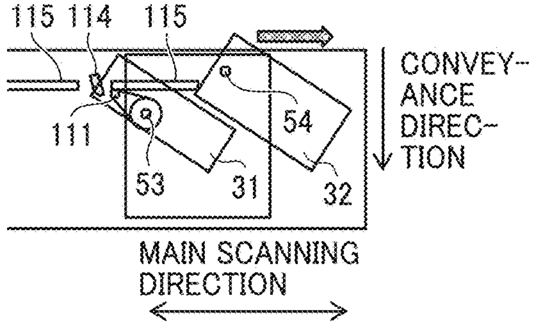

Next, as illustrated in FIG. 19F, the base member 48 holding the crimper 32 and the liquid applier 31 moves rightward along the main scanning direction. The posture switching lever 111 is pivoted toward below the guide rail 115. Specifically, the posture switching lever 111 moves toward below the guide rail 115 (below the posture switching claw shaft 119 of the posture switching claw 114) and moves in the main scanning direction. Thus, the posture switching claw 114 is pivoted counterclockwise against a biasing force of the biasing spring 117. As the base member 48 further moves rightward, the posture switching lever 111 moves over the posture switching claw 114 rightward (see FIGS. 18E and 18F). As a result, the liquid applier 31 is pivoted to the oblique binding posture.

In short, when the posture switching lever 111 passes by the posture switching claw 114 in a first direction (rightward) along the main scanning direction, the liquid applier 31 is pivoted from the parallel binding posture to the oblique binding posture. When the crimper 32 and the liquid applier 31 are pivoted from the parallel binding posture to the oblique binding posture, the crimper 32 is pivoted to the oblique binding posture before the liquid applier 31 is pivoted to the oblique binding posture.

Figure 19G:
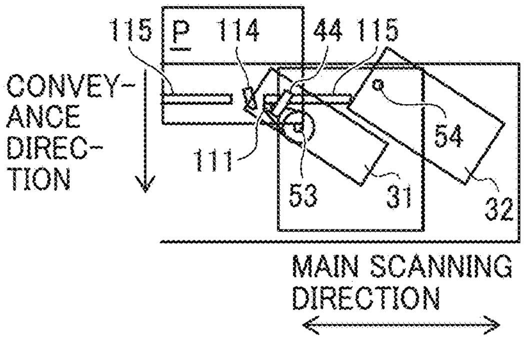

Next, as illustrated in FIG. 19G, the base member 48 holding the crimper 32 and the liquid applier 31 is moved rightward. When the liquid applier 31 in the oblique binding posture is moved to a liquid application position, the liquid application member 44 is brought into contact with and separated from the sheet P to perform a liquid applying operation.

Figure 19H:
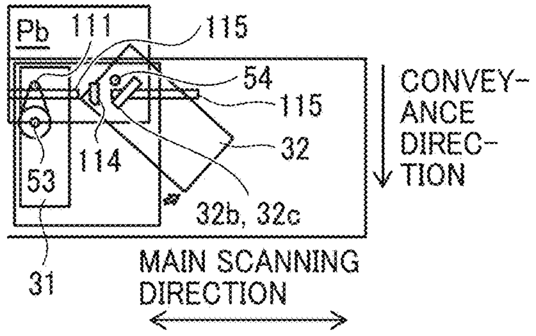

Next, as illustrated in FIG. 19H, when the sheet bundle Pb is placed, the base member 48 holding the crimper 32 and the liquid applier 31 is moved leftward. When the crimper 32 in the oblique binding posture moves to a crimping position, the pair of binding teeth 32*b* and 32*c* are brought into contact with and separated from the sheet bundle Pb to perform a crimping operation.

Figure 20A:
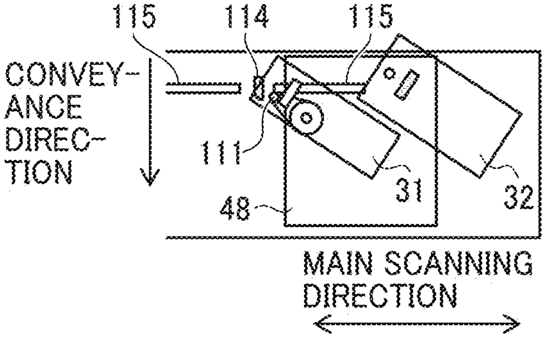
FIGS. 20A to 20D are diagrams illustrating the posture of the crimper and the liquid applier changing to a "parallel binding posture."

FIGS. 20A to 20D are diagrams illustrating an operation procedure for changing the crimper 32 and the liquid applier 31 to the "parallel binding posture" (as a posture at the home position). First, as illustrated in FIG. 20A, the crimper 32 and the liquid applier 31 are in the oblique binding posture.

Figure 20B:
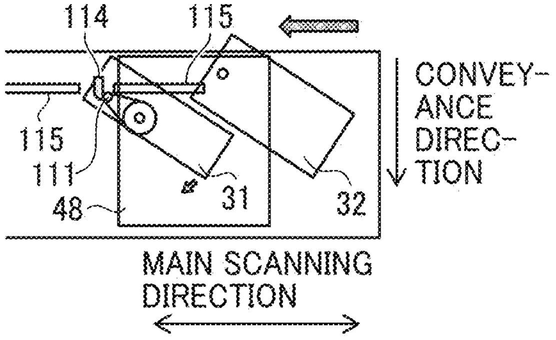

Next, as illustrated in FIG. 20B, the base member 48 holding the crimper 32 and the liquid applier 31 is moved leftward. When the posture switching lever 111 contacts the posture switching claw 114, the posture switching lever 111 starts clockwise rotation in FIG. 20B because the restrained clockwise rotation of the posture switching claw 114 hampers the leftward movement of the posture switching lever 111 along the leftward movement of the base member 48.

Figure 20C:
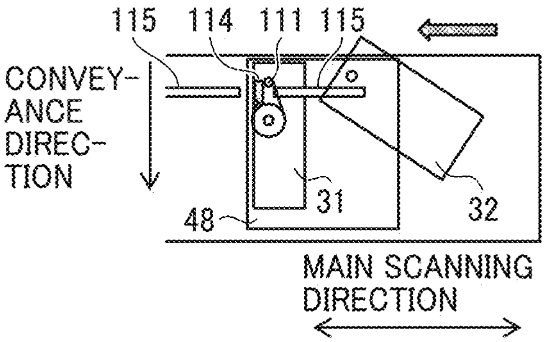

Next, as illustrated in FIG. 20C, the base member 48 is moved leftward. The posture switching lever 111 is pivoted toward above the guide rail 115. When the posture switching lever 111 moves toward above the guide rail 115, the base member 48 is moved rightward to prevent the posture switching lever 111 from moving over the posture switching claw 114. Thus, the liquid applier 31 is pivoted to the parallel binding posture.

In short, when the posture switching lever 111 passes by the posture switching claw 114 in a second direction (leftward) opposite to the first direction along the main scanning direction, the liquid applier 31 is pivoted from the oblique binding posture to the parallel binding posture. When the crimper 32 and the liquid applier 31 are pivoted from the oblique binding posture to the parallel binding posture, the liquid applier 31 is pivoted to the parallel binding posture before the crimper 32 is pivoted to the parallel binding posture.

In the configuration described above, the crimper 32 and the liquid applier 31 are pivoted to the parallel binding posture and the oblique binding posture with the posture switching lever 111 and the posture switching claw 114. Since the timing for pivoting the liquid applier 31 is different from the timing for pivoting the crimper 32, the control for pivoting the liquid applier 31 and the crimper 32 is simplified as compared with a typical configuration in which the liquid applier 31 and the crimper 32 are pivoted together. Further, interference between the liquid applier 31 and the crimper 32 is avoided by pivoting the liquid applier 31 after pivoting the crimper 32 into the oblique binding posture and by pivoting the crimper 32 after pivoting the liquid applier 31 into the parallel binding posture.

Figure 20D:
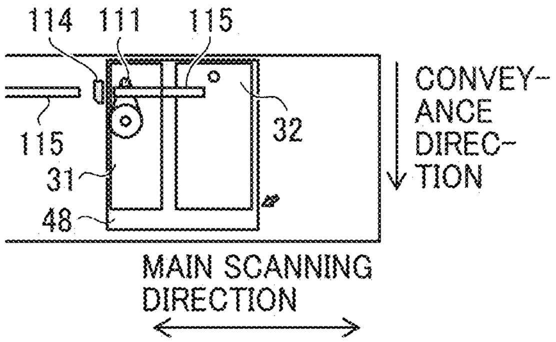

Next, as illustrated in FIG. 20D, the pivot motor 56 is driven to pivot the crimper 32 in the clockwise direction in FIG. 20D. Thus, the crimper 32 is pivoted to the parallel binding posture.

In the edge binding unit 25 described above with reference to FIG. 14, the liquid applier pivot 53 is pivoted integrally with the posture switching lever 111. Alternatively, the liquid applier pivot 53 may be separated from the posture switching lever 111 and pivoted in conjunction with the posture switching lever 111 via a gear train and a timing belt.

FIGS. 21A to 21E illustrate a case where a plurality of portions in the width direction of the sheet bundle Pb is subjected to the parallel binding with the liquid applier 31 and the crimper 32 in the parallel binding posture (first binding posture). As described above, in the parallel binding posture, the longitudinal direction (in other words, the long side) of the end of each of the pair of binding teeth 32*b* and 32*c* and the liquid application member 44 coincides with the main scanning direction.

Figure 21A:
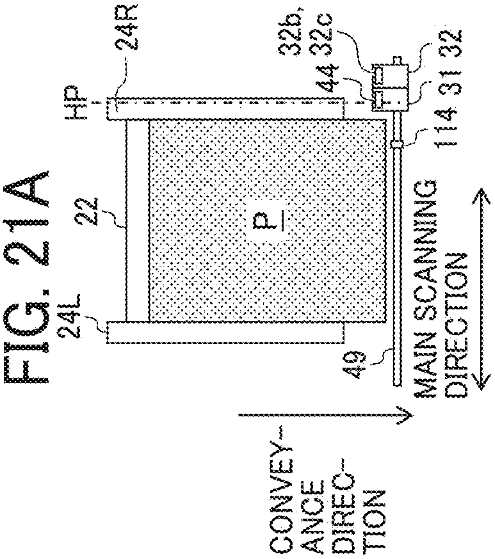
FIGS. 21A to 21E are diagrams illustrating a parallel binding operation of the crimper and the liquid applier.
Figure 21B:
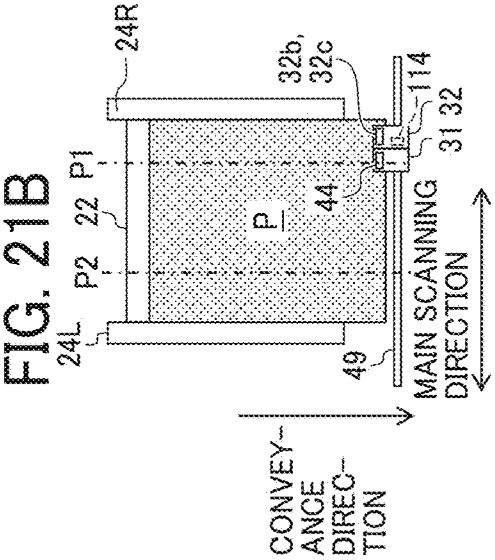

First, the edge binding unit 25 is moved from a standby position HP illustrated in FIG. 21A to a first binding position P1 illustrated in FIG. 21B to position the liquid applier 31 at the first binding position P1 before the sheet P is conveyed to the internal tray 22.

Figure 21C:
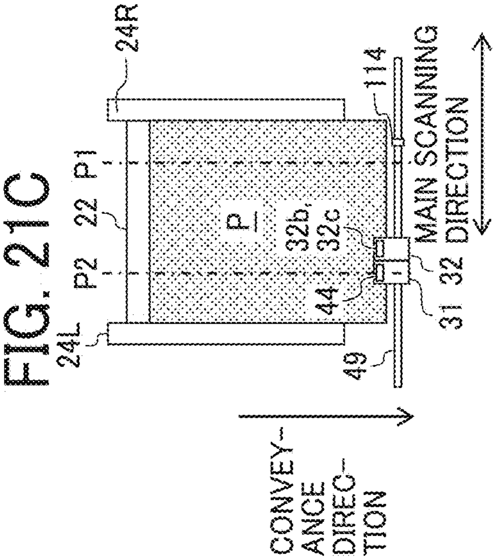

When the sheet P supported on the internal tray 22 is aligned in the main scanning direction and the conveyance direction, the liquid applier 31 at the first binding position P1 applies liquid to the sheet P. After applying the liquid at the first binding position P1, the liquid applier 31 moves to a second binding position P2 as illustrated in FIG. 21C. After arriving at the second binding position P2, the liquid applier 31 applies the liquid to the sheet P at the second binding position P2.

Then, the liquid application described above with reference to FIGS. 21B and 21C is repeated until the number of sheets P placed on the internal tray 22 reaches the given number of sheets (the number of sheets P of the sheet bundle Pb).

Figure 21D:
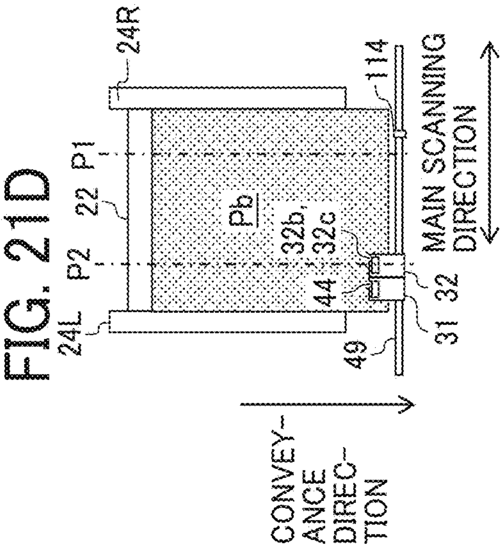
Figure 21E:
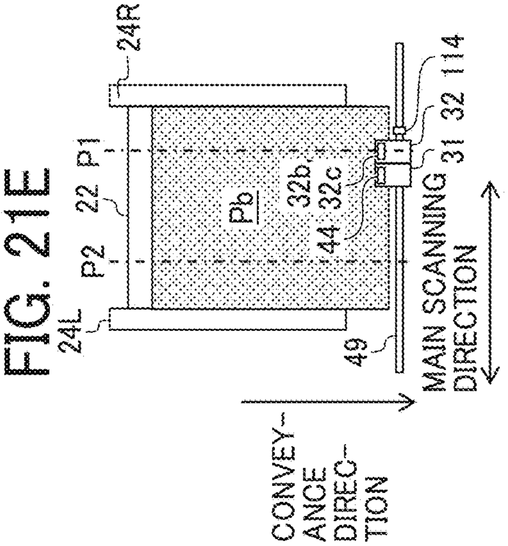

When the number of sheets P placed on the internal tray 22 reaches the given number of sheets, as illustrated in FIG. 21D, the edge binding unit 25 is moved in the main scanning direction to position the crimper 32 at the second binding position P2. After arriving at the second binding position P2, the crimper 32 crimps and binds the sheet bundle Pb at the second binding position P2. After the crimper 32 crimps and binds the sheet bundle Pb at the second binding position P2, as illustrated in FIG. 21E, the edge binding unit 25 is moved in the main scanning direction to position the crimper 32 at the first binding position P1. After arriving at the second binding position P2, the crimper 32 crimps and binds the sheet bundle Pb at the first binding position P1.

After the crimper 32 crimps and binds the sheet bundle Pb at the first binding position P1, the edge binding unit 25 is moved to the standby position HP illustrated in FIG. 21A to complete the binding process.

In the embodiment described above, the single liquid applier 31 and the single crimper 32 are disposed. However, the number of the liquid applier 31 and the number of the crimper 32 are not limited to one. Alternatively, as illustrated in FIGS. 22A and 22B, the post-processing apparatus 3 according to a third modification of the embodiments described above includes two liquid appliers 31L and 31R and two crimpers 32L and 32R.

Figure 22A:
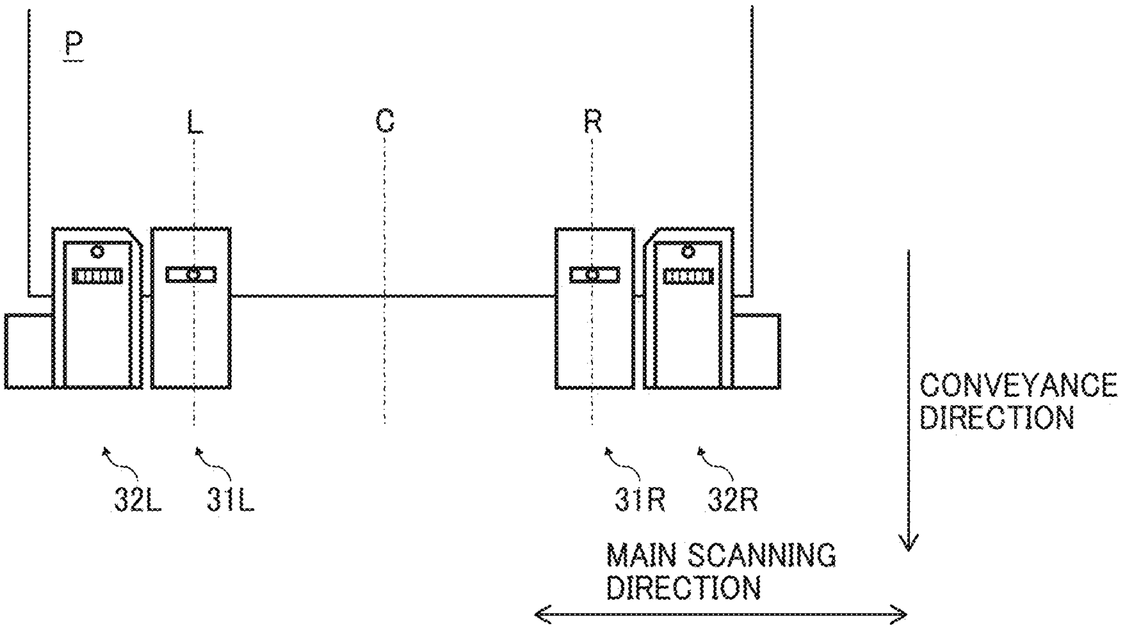
FIGS. 22A and 22B are diagrams illustrating a post-processing apparatus according to a third modification of the above embodiments of the present disclosure.
Figure 22B:
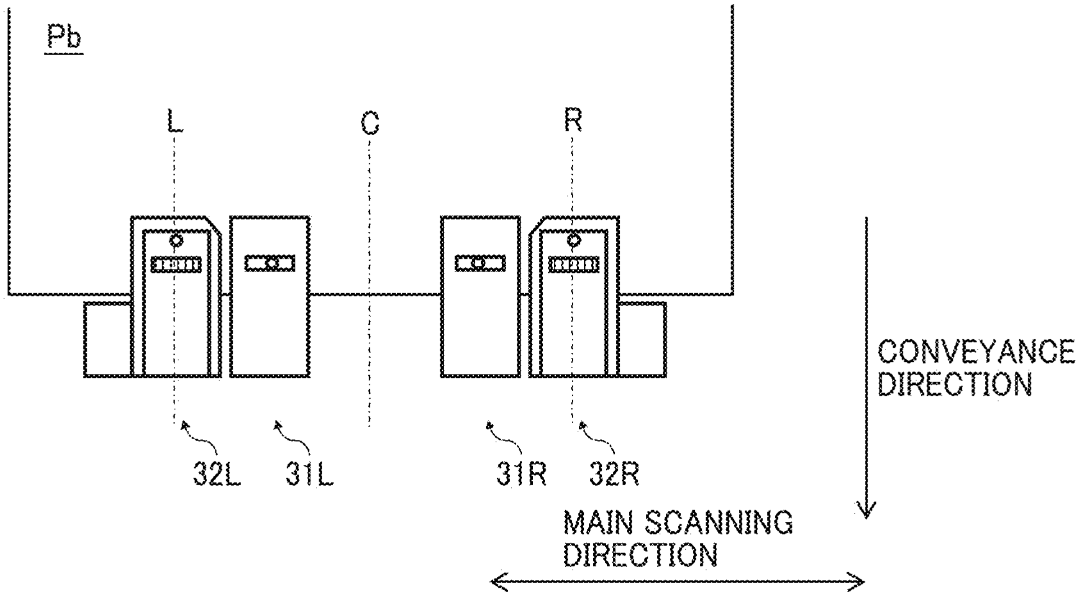

According to the present modification, the liquid applier 31L and the crimper 32L are disposed to the left, in the main scanning direction, of a center C of the sheet P supported on the internal tray 22 in FIGS. 22A and 22B. The liquid applier 31L applies liquid to a left binding position L to the left of the center C of the sheet P (FIG. 22A) whereas the crimper 32L crimps and binds the left binding position L on the sheets P (FIG. 22B). The liquid applier 31L and the crimper 32L are pivotable clockwise in FIGS. 22A and 22B between the parallel binding posture and the oblique binding posture (or the vertical binding posture).

The liquid applier 31R and the crimper 32R are disposed to the right, in the main scanning direction, of the center C of the sheet P supported on the internal tray 22 in FIGS. 22A and 22B. The liquid applier 31R applies liquid to a right binding position R to the right of the center C of the sheet P (FIG. 22A) whereas the crimper 32R crimps and binds the right binding position R on the sheets P (FIG. 22B). The liquid applier 31R and the crimper 32R are pivotable counterclockwise in FIGS. 22A and 22B between the parallel binding posture and the oblique binding posture (or the vertical binding posture). As described above, the liquid applier 31L and the crimper 32L are disposed opposite the liquid applier 31R and the crimper 32R in the width direction of the sheet P across the center C of the sheet P.

According to the third modification, the liquid is applied to two portions on the sheet bundle Pb simultaneously. Similarly, the two portions on the sheet bundle Pb are simultaneously crimped and bound. Such a configuration increases the speed of the binding process.

Now, a description is given of a second embodiment of the present disclosure. Specifically, with reference to FIGS. 23 to 29, a description is now given of a post-processing apparatus 3A according to the second embodiment of the present disclosure. In the following description, components like those of the first embodiment are denoted by like reference numerals, and redundant descriptions thereof may be omitted.

The post-processing apparatus 3A according to the second embodiment is different from the post-processing apparatus 3 according to the first embodiment in which the liquid applier 31 and the crimper 32 are arranged side by side. In the post-processing apparatus 3A according to the second embodiment, a liquid applier 131 is disposed alone at an upstream position on the conveyance passage in the conveyance direction. Such a configuration allows a given number of sheets P to be stacked after the liquid is applied and conveyed to the crimper 32 that is disposed at a downstream position on the conveyance passage in the conveyance direction. Accordingly, the productivity of the binding process performed by the crimper 32 is enhanced. Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "opposite conveyance direction" in the following description. A direction orthogonal to the opposite conveyance direction and to the thickness direction of the sheet P is defined as the "main scanning direction (width direction of the sheet P)."

Figure 23:
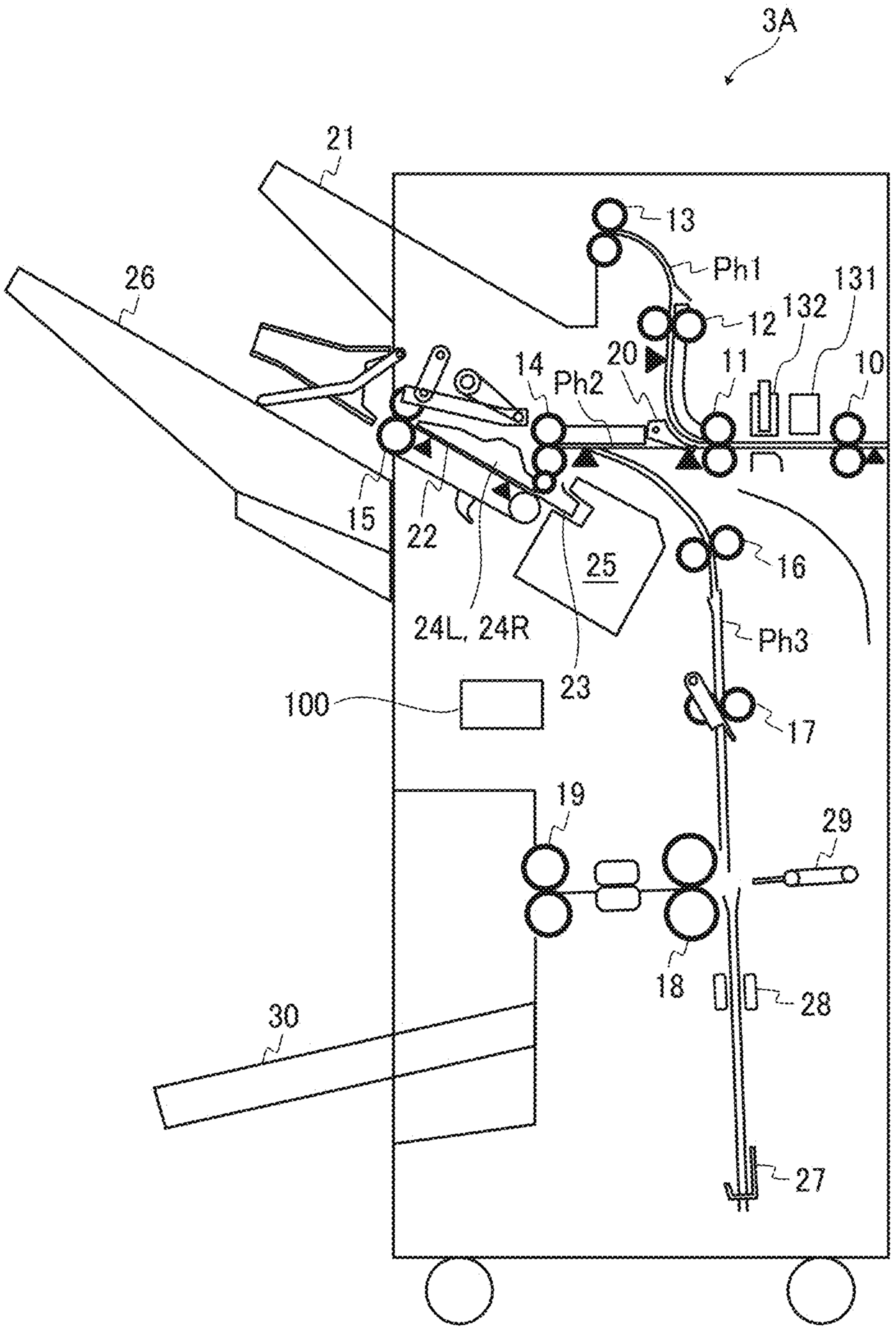
FIG. 23 is a diagram illustrating an internal configuration of a post-processing apparatus according to a second embodiment of the present disclosure.

FIG. 23 is a diagram illustrating an internal configuration of the post-processing apparatus 3A according to the second embodiment of the present disclosure. As illustrated in FIG. 23, the post-processing apparatus 3A further includes the liquid applier 131 and a punch-hole forming unit 132 (processing unit). The liquid applier 131 and the punch-hole forming unit 132 are disposed upstream from the internal tray 22 in the opposite conveyance direction. In addition, the liquid applier 131 and the punch-hole forming unit 132 are disposed at different positions in the opposite conveyance direction to simultaneously face one sheet P conveyed by the conveyance roller pairs 10 to 19. The liquid applier 131 and the punch-hole forming unit 132 according to the present embodiment are disposed between the conveyance roller pairs 10 and 11. However, the arrangement of the liquid applier 131 and the punch-hole forming unit 132 is not limited to the embodiment illustrated in FIG. 23.

Figure 29:
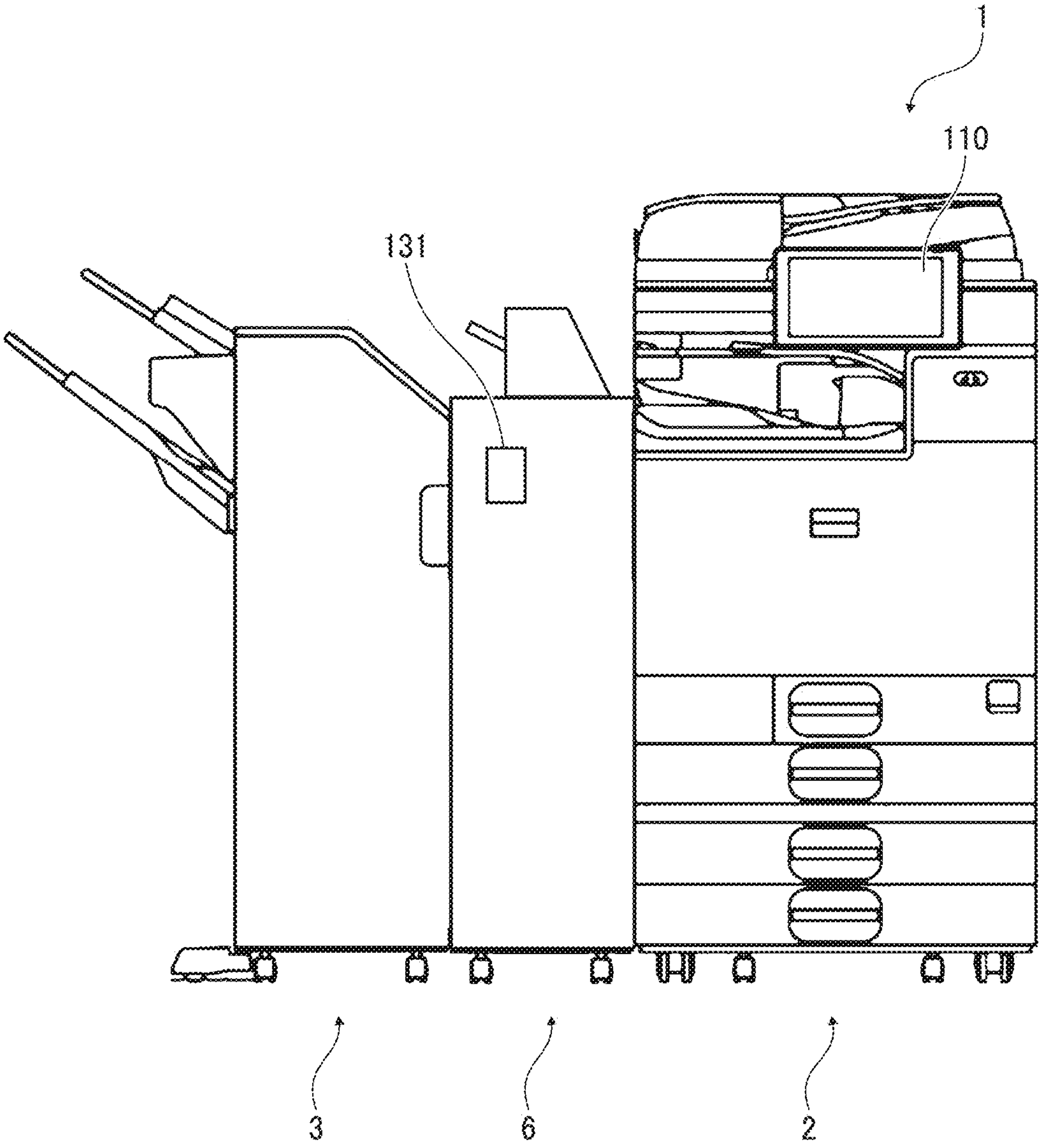
FIG. 29 is a diagram illustrating the overall configuration of an image forming system according to a modification of the above embodiments of the present disclosure.

For example, in a case where an inserter 6 is disposed between the image forming apparatus 2 and the post-processing apparatus 3 as illustrated in FIG. 29, the liquid applier 131 may be disposed inside the inserter 6 located upstream from the post-processing apparatus 3 in a direction in which the sheet P is conveyed from the image forming apparatus 2 to the post-processing apparatus 3. Examples of the inserter 6 include a device that allows a pre-printed medium, which is to be conveyed to the post-processing apparatus 3 together with the sheet P conveyed from the image forming apparatus 2, to be fed as a cover sheet, an insertion sheet, or a partition sheet without passing through the image forming apparatus 2.

Figure 24A:
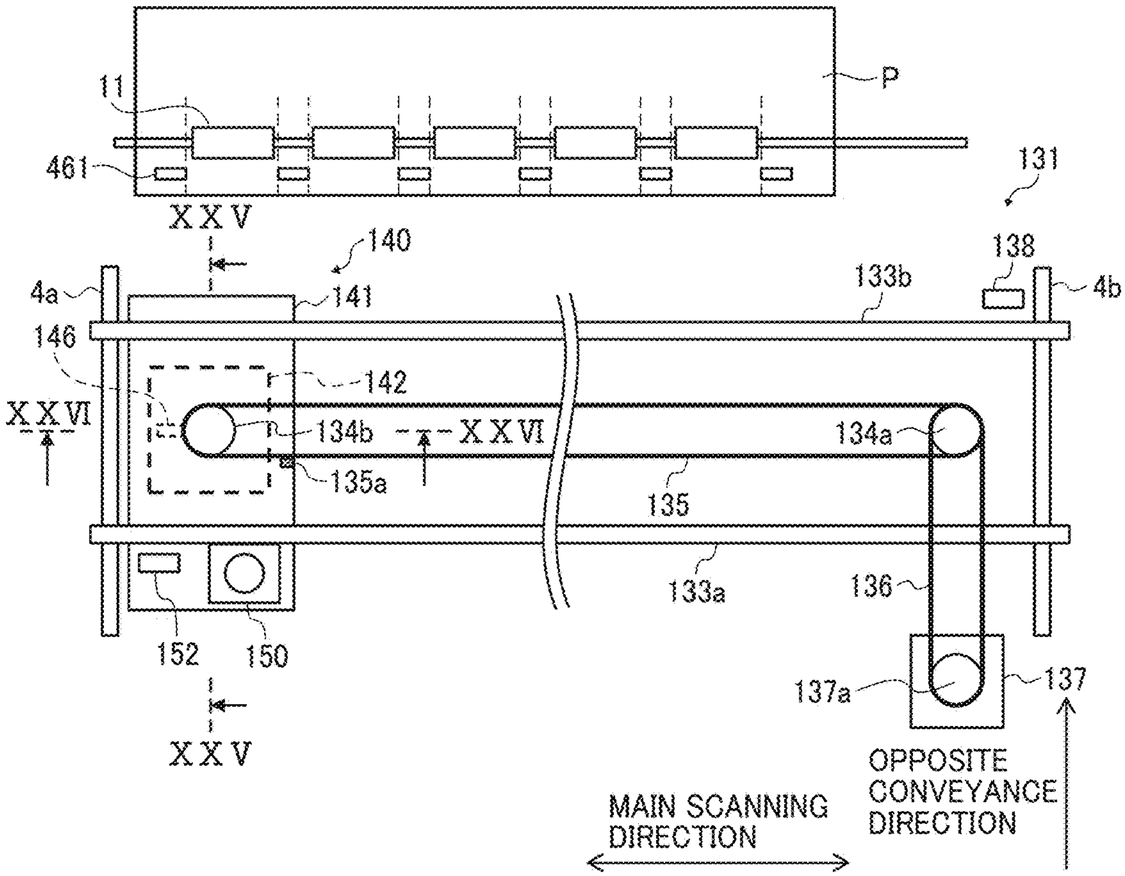
FIGS. 24A and 24B are views of a liquid applier in a thickness direction of a sheet, according to the second embodiment of the present disclosure.

As illustrated in FIG. 24A, the conveyance roller pair 11 is disposed at a position that does not overlap, in the main scanning direction, a liquid application position 461 on the sheet P to which the liquid has been applied by a liquid application head 146 of the liquid applier 131. This is to prevent the amount of liquid at the liquid application position 461 from decreasing due to the plurality of roller pairs pressing the liquid application position 461 when the conveyance roller pair 11 conveys the sheet P. As a result, when the sheet P reaches the edge binding unit 25 disposed downstream from the liquid applier 131 in the opposite conveyance direction, the amount of liquid at the liquid application position 461 is sufficient to maintain the binding strength. Accordingly, the binding strength of the sheet bundle Pb is prevented from decreasing due to a decrease in the amount of liquid at the liquid application position 461 while the sheet P is conveyed.

In addition, the plurality of roller pairs of the conveyance roller pair 11 located at the position that does not overlap the liquid application position 461 on the sheet P in the main scanning direction prevents the conveying performance of the sheet P from being worsen due to adhesion of liquid to the plurality of roller pairs, and further prevents a conveyance jam caused when the conveying performance of the sheet P is worsen.

Although only the conveyance roller pair 11 has been described above, the plurality of roller pairs of the conveyance roller pairs 14 and 15 are preferably disposed at positions that do not overlap the liquid application position 461 on the sheet P in the main scanning direction, like the plurality of rollers of the conveyance roller pair 11.

The liquid applier 131 applies liquid (for example, water) to the sheet P conveyed by the conveyance roller pairs 10 and 11. In the following description, the application of liquid may be referred to as "liquid application." The punch-hole forming unit 132 forms punch holes in the sheet P conveyed by the conveyance roller pairs 10 and 11 such that the punch holes penetrate the sheet P in the thickness direction of the sheet P. The processing unit disposed near the liquid applier 131 is not limited to the punch-hole forming unit 132. Alternatively, the processing unit may be an inclination correction unit that corrects an inclination (skew) of the sheet P conveyed by the conveyance roller pairs 10 and 11.

Figure 24B:
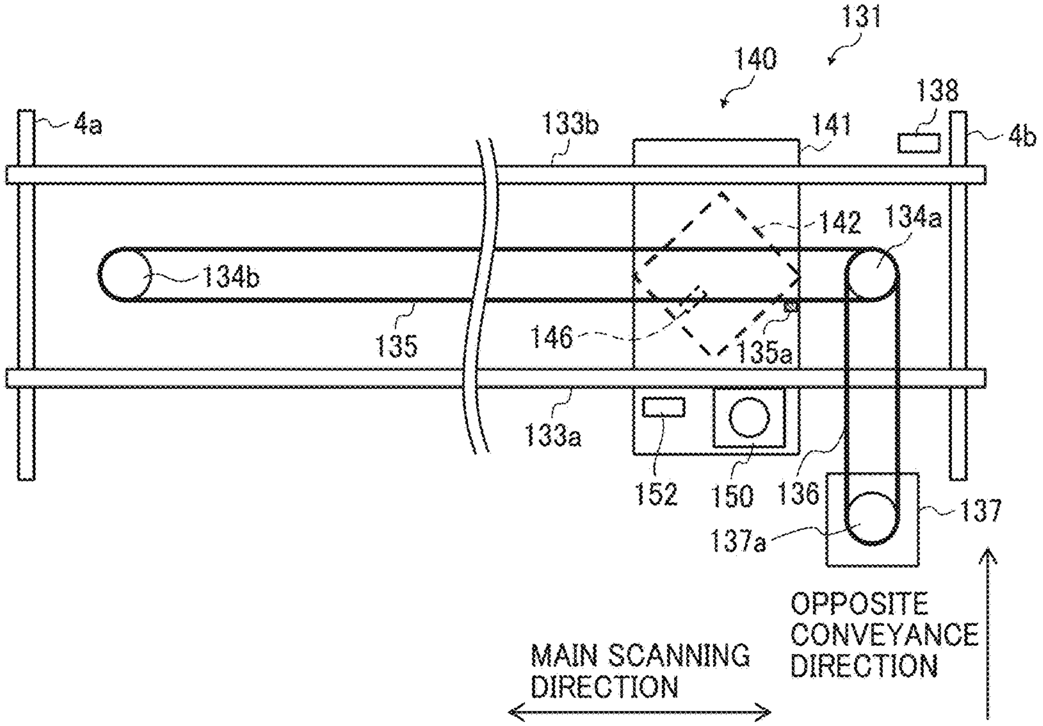
Figure 25C:
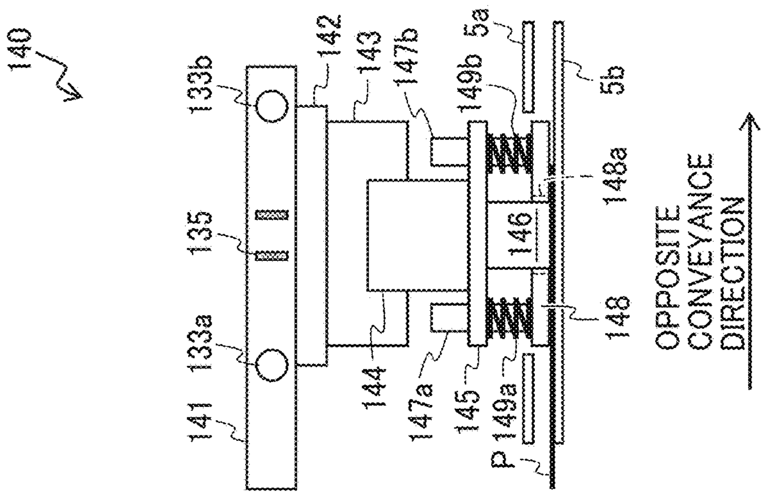
FIGS. 25A to 25C are cross-sectional views of a liquid application unit of the liquid applier taken through XXV-XXV of FIG. 24A.
Figure 25B:
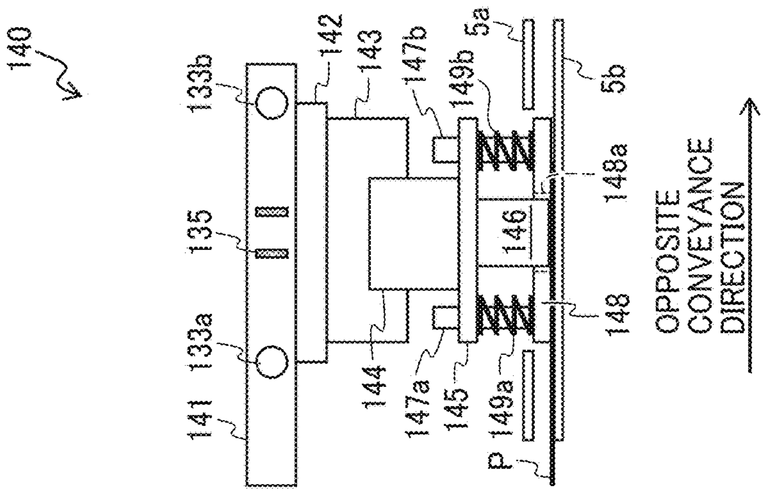
Figure 25A:
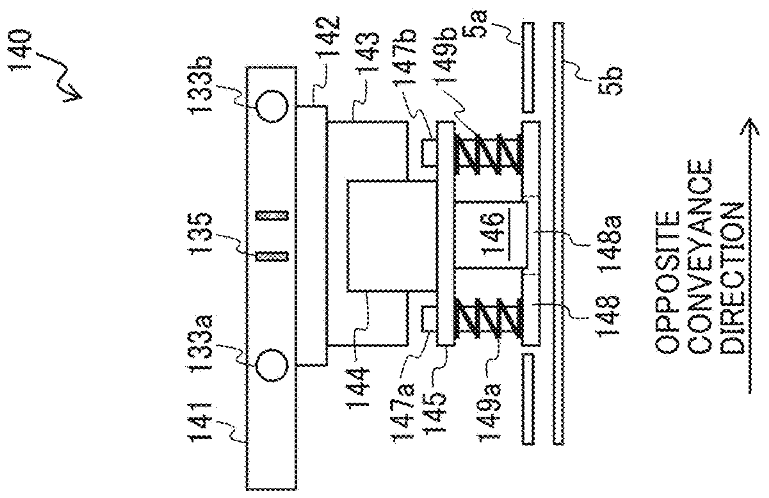
Figure 26A:
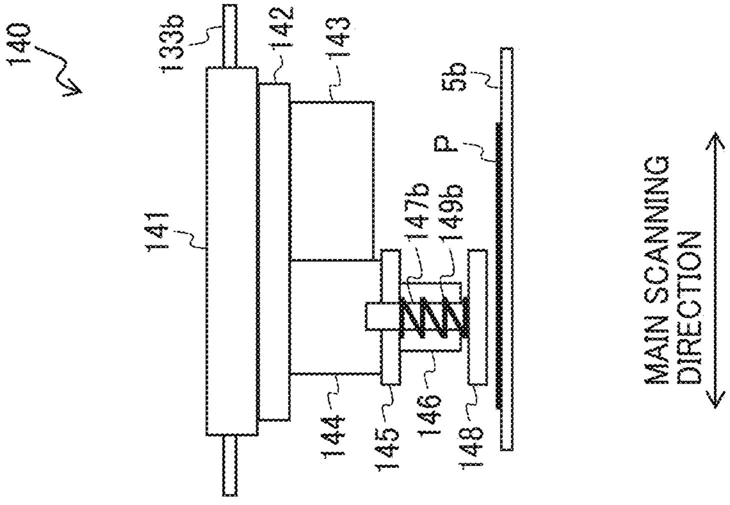
FIGS. 26A to 26C are cross-sectional views of the liquid application unit taken through XXVI-XXVI of FIG. 24A.
Figure 26B:
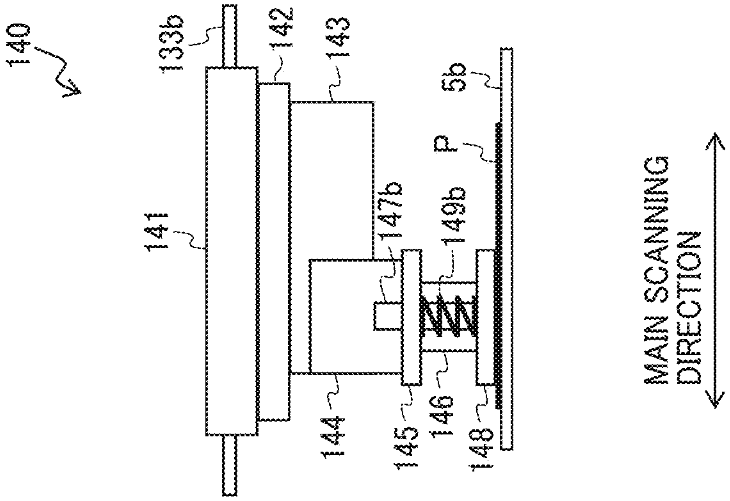
Figure 26C:
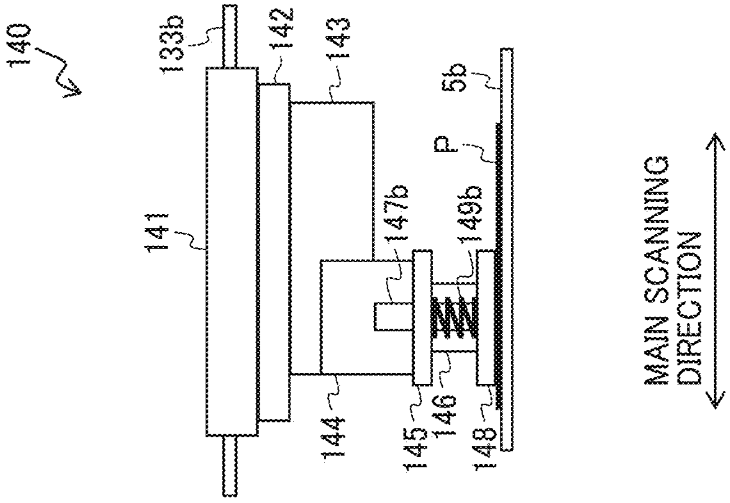

FIGS. 24A and 24B are views of the liquid applier 131 in the thickness direction of the sheet P, according to the second embodiment of the present disclosure. FIGS. 25A to 25C are cross-sectional views of a liquid application unit 140 of the liquid applier 131 taken through XXV-XXV of FIG. 24A. FIGS. 26A to 26C are cross-sectional views of the liquid application unit 140 taken through XXVI-XXVI of FIG. 24A. As illustrated in FIGS. 24A to 26C, the liquid applier 131 includes a pair of guide shafts 133*a* and 133*b*, a pair of pulleys 134*a* and 134*b*, endless annular belts 135 and 136, a slide motor 137, a home position sensor 138, and the liquid application unit 140.

The guide shafts 133*a* and 133*b*, each extending in the main scanning direction, are apart from each other in the opposite conveyance direction. The pair of guide shafts 133*a* and 133*b* is supported by a pair of side plates 4*a* and 4*b* of the post-processing apparatus 3A. On the other hand, the pair of guide shafts 133*a* and 133*b* supports the liquid application unit 140 such that the liquid application unit 140 can move in the main scanning direction.

The pair of pulleys 134*a* and 134*b* is disposed between the guide shafts 133*a* and 133*b* in the opposite conveyance direction. On the other hand, the pulleys 134*a* and 134*b* are apart from each other in the main scanning direction. The pair of pulleys 134*a* and 134*b* is supported by a frame of the post-processing apparatus 3A so as to be rotatable about an axis extending in the thickness direction of the sheet P.

The endless annular belt 135 is entrained around the pair of pulleys 134*a* and 134*b*. The endless annular belt 135 is coupled to the liquid application unit 140 by a connection 135*a*. The endless annular belt 136 is entrained around the pulley 134*a* and an output shaft 137*a* of the slide motor 137. The slide motor 137 generates a driving force to move the liquid application unit 140 in the main scanning direction.

As the slide motor 137 rotates, the endless annular belt 136 circulates around the pulley 134*a* and the output shaft 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to the rotation direction of the slide motor 137 being switched.

The home position sensor 138 detects that the liquid application unit 140 has reached a home position in the main scanning direction. The home position sensor 138 then outputs a home position signal indicating the detection result to the controller 100 described below (see FIG. 27). The home position sensor 138 is, for example, an optical sensor including a light emitting unit and a light receiving unit. The liquid application unit 140 at the home position blocks an optical path between the light emitting unit and the light receiving unit. Then, the home position sensor 138 outputs the home position signal in response to the light output from the light emitting unit not being received by the light receiving unit. The specific configuration of the home position sensor 138 is not limited to the aforementioned example.

As illustrated in FIGS. 25A to 25C, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 faces the conveyance passage through the opening of the upper guide plate 5*a* to face the sheet P conveyed along the conveyance passage.

As illustrated in FIGS. 24A to 26C, the liquid application unit 140 includes a base member 141, a rotary bracket 142, a liquid storage tank 143, a mover 144, a holding member 145, the liquid application head 146, columnar members 147*a* and 147*b*, a pressure plate 148, coil springs 149*a* and 149*b*, a rotary motor 150, a movement motor 151 (see FIG. 27), and a home angle sensor 152.

The base member 141 is supported by the pair of guide shafts 133*a* and 133*b* so as to be slidable in the main scanning direction. The base member 141 is coupled to the endless annular belt 135 by a connection 135*a*. On the other hand, the base member 141 supports the aforementioned components of the liquid application unit 140, namely, the rotary bracket 142, the liquid storage tank 143, the mover 144, the holding member 145, the liquid application head 146, the columnar members 147*a* and 147*b*, the pressure plate 148, the coil springs 149*a* and 149*b*, the rotary motor 150, the movement motor 151, and the home angle sensor 152.

The rotary bracket 142 is supported by a lower face of the base member 141 so as to be pivotable about an axis extending in the thickness direction of the sheet P. The rotary bracket 142 is rotated with respect to the base member 141 by a driving force transmitted from the rotary motor 150. On the other hand, the rotary bracket 142 supports the liquid storage tank 143, the mover 144, the holding member 145, the liquid application head 146, the columnar members 147*a* and 147*b*, the pressure plate 148, and the coil springs 149*a* and 149*b*.

The home angle sensor 152 detects that the rotary bracket 142 has reached a home angle. The home angle sensor 152 then outputs a home angle signal indicating the detection result to the controller 100. The home angle is, for example, an angle for parallel binding. The home angle sensor 152 is, for example, an optical sensor including a light emitting unit and a light receiving unit. The rotary bracket 142 at the home angle blocks an optical path between the light emitting unit and the light receiving unit. Then, the home angle sensor 152 outputs the home angle signal in response to the light output from the light emitting unit not being received by the light receiving unit. The specific configuration of the home angle sensor 152 is not limited to the aforementioned example.

Note that FIG. 24A illustrates the rotary bracket 142 in a position for the parallel binding that is performed by the crimper 32 disposed downstream from the liquid applier 131 in the conveyance direction. FIG. 24B illustrates the rotary bracket 142 in a position for diagonal binding (corner binding) that is performed by the crimper 32 disposed downstream from the liquid applier 131 in the conveyance direction.

The liquid storage tank 143 stores liquid to be applied to the sheet P. The mover 144 is supported by the liquid storage tank 143 so as to be movable (for example, up and down) in the thickness direction of the sheet P. The mover 144 is moved with respect to the liquid storage tank 143 by a driving force transmitted from the movement motor 151. The holding member 145 is attached to a lower end of the mover 144. The liquid application head 146 projects from the holding member 145 toward the conveyance passage (downward in the present embodiment). The liquid stored in the liquid storage tank 143 is supplied to the liquid application head 146. The liquid application head 146 is made of a material having a relatively high liquid absorption (for example, sponge or fiber).

The columnar members 147*a* and 147*b* project downward from the holding member 145 around the liquid application head 146. The columnar members 147*a* and 147*b* can move relative to the holding member 145 in the thickness direction. The columnar members 147*a* and 147*b* have respective lower ends holding the pressure plate 148. The pressure plate 148 has a through hole 148*a* at a position where the through hole 148*a* faces the liquid application head 146. The coil springs 149*a* and 149*b* are fitted around the columnar members 147*a* and 147*b*, respectively, between the holding member 145 and the pressure plate 148. The coil springs 149*a* and 149*b* bias the columnar members 147*a* and 147*b* and the pressure plate 148 downward with respect to the holding member 145.

As illustrated in FIGS. 25A and 26A, before the sheet P is conveyed to the position where the sheets P faces the opening of the upper guide plate 5*a*, the pressure plate 148 is positioned at or above the opening. Next, when the sheet P conveyed by the conveyance roller pairs 10 and 11 stops at a position where the liquid application position on the sheet P faces the opening, the movement motor 151 is rotated in the first direction. As a result, the mover 144, the holding member 145, the liquid application head 146, the columnar members 147*a* and 147*b*, the pressure plate 148, and the coil springs 149*a* and 149*b* are moved down together to allow the lower pressure plate 148 to contact the sheet P. Note that the liquid application position corresponds to a binding position on the sheet P to be crimped and bound by the edge binding unit 25. Unlike the first embodiment, the edge binding unit 25 according to the second embodiment includes the crimper 32 alone.

As the movement motor 151 keeps rotating in the first direction after the pressure plate 148 contacts the sheet P, the coil springs 149*a* and 149*b* are compressed to further move down the mover 144, the holding member 145, the liquid application head 146, and the columnar members 147*a* and 147*b*.

As a result, as illustrated in FIGS. 25B and 26B, a lower face of the liquid application head 146 contacts the sheet P through the through hole 148*a*. Then, the liquid contained in the liquid application head 146 is applied to the sheet P.

Further rotation of the movement motor 151 in the first direction further strongly presses the liquid application head 146 against the sheet P as illustrated in FIGS. 25C and 26C. Accordingly, the amount of liquid applied to the sheet P increases. In short, the liquid applier 131 changes the pressing force of the liquid application head 146 against the sheet P to adjust the amount of liquid applied to the sheet P.

On the other hand, the rotation of the movement motor 151 in the second direction opposite to the first direction moves up the mover 144, the holding member 145, the liquid application head 146, the columnar members 147*a* and 147*b*, the pressure plate 148, and the coil springs 149*a* and 149*b* together. As a result, as illustrated in FIGS. 25A and 26A, the liquid application head 146 and the pressure plate 148 are separated from the sheet P. In other words, the liquid applier 131 includes the liquid application head 146 that can be separated from the sheet P.

Figure 27:
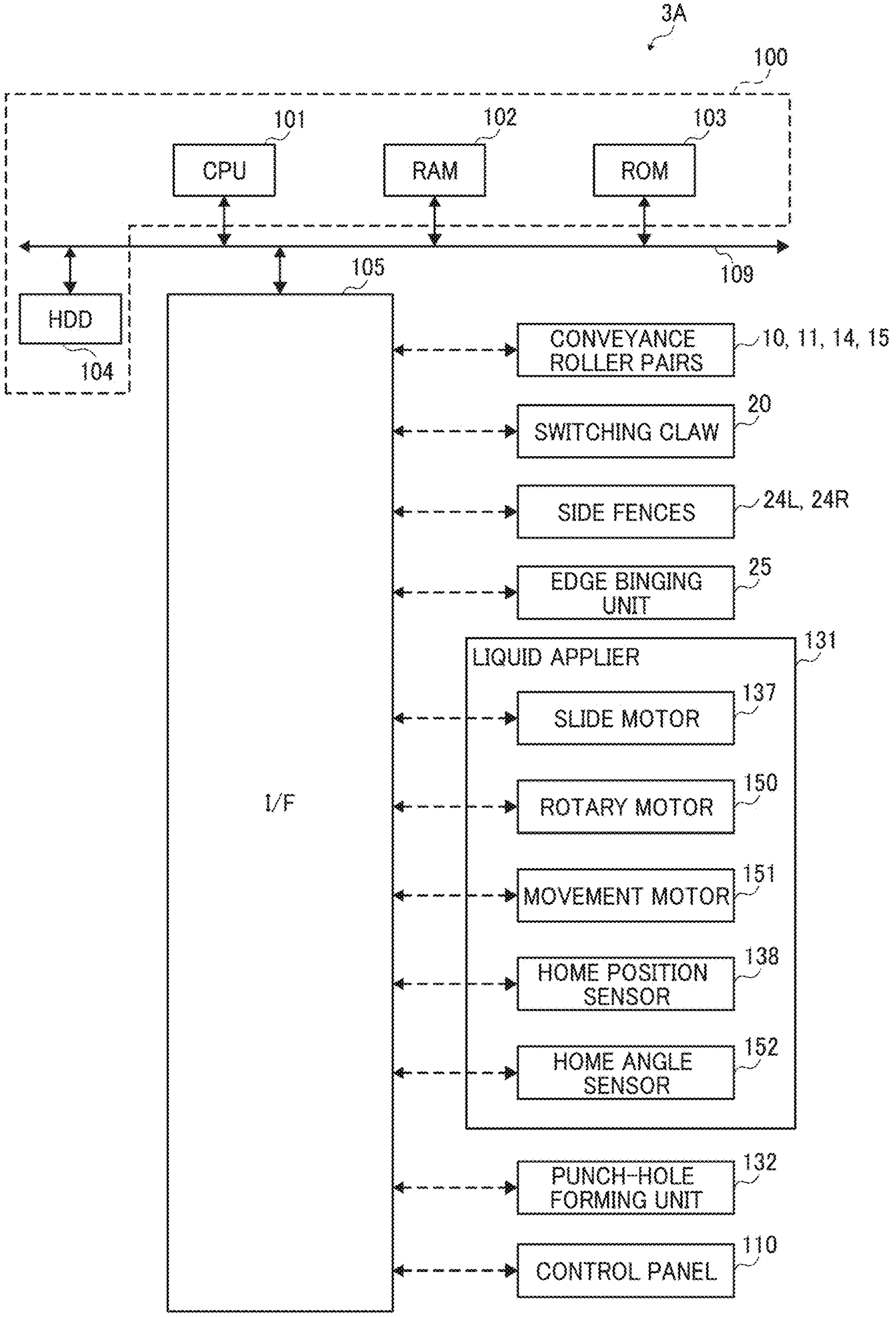
FIG. 27 is a block diagram illustrating a hardware configuration of the post-processing apparatus to control the operation of the post-processing apparatus according to the second embodiment of the present disclosure.

FIG. 27 is a block diagram illustrating a hardware configuration of the post-processing apparatus 3A to control the operation of the post-processing apparatus 3A according to the second embodiment of the present disclosure. As illustrated in FIG. 27, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, for example, an OS, various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects the conveyance roller pairs 10, 11, 14, and 15, the switching claw 20, the side fences 24L and 24R, the edge binding unit 25, the liquid applier 131, the punch-hole forming unit 132, and the control panel 110 to the common bus 109. The controller 100 controls, via the I/F 105, the operations of the conveyance roller pairs 10, 11, 14, and 15, the switching claw 20, the side fences 24L and 24R, the edge binding unit 25, the liquid applier 131, and the punch-hole forming unit 132. Although FIG. 27 illustrates the components that execute the edge stitching, the components that execute the saddle stitching are controlled by the controller 100 like the components that execute the edge stitching.

The control panel 110 includes an operation unit that receives instructions input by a user and a display (notification unit) that notifies the user of information. The operation unit includes, for example, hard keys and a touch panel superimposed on a display. The control panel 110 acquires information from the user through the operation unit and provides information to the user through the display.

Figure 28:
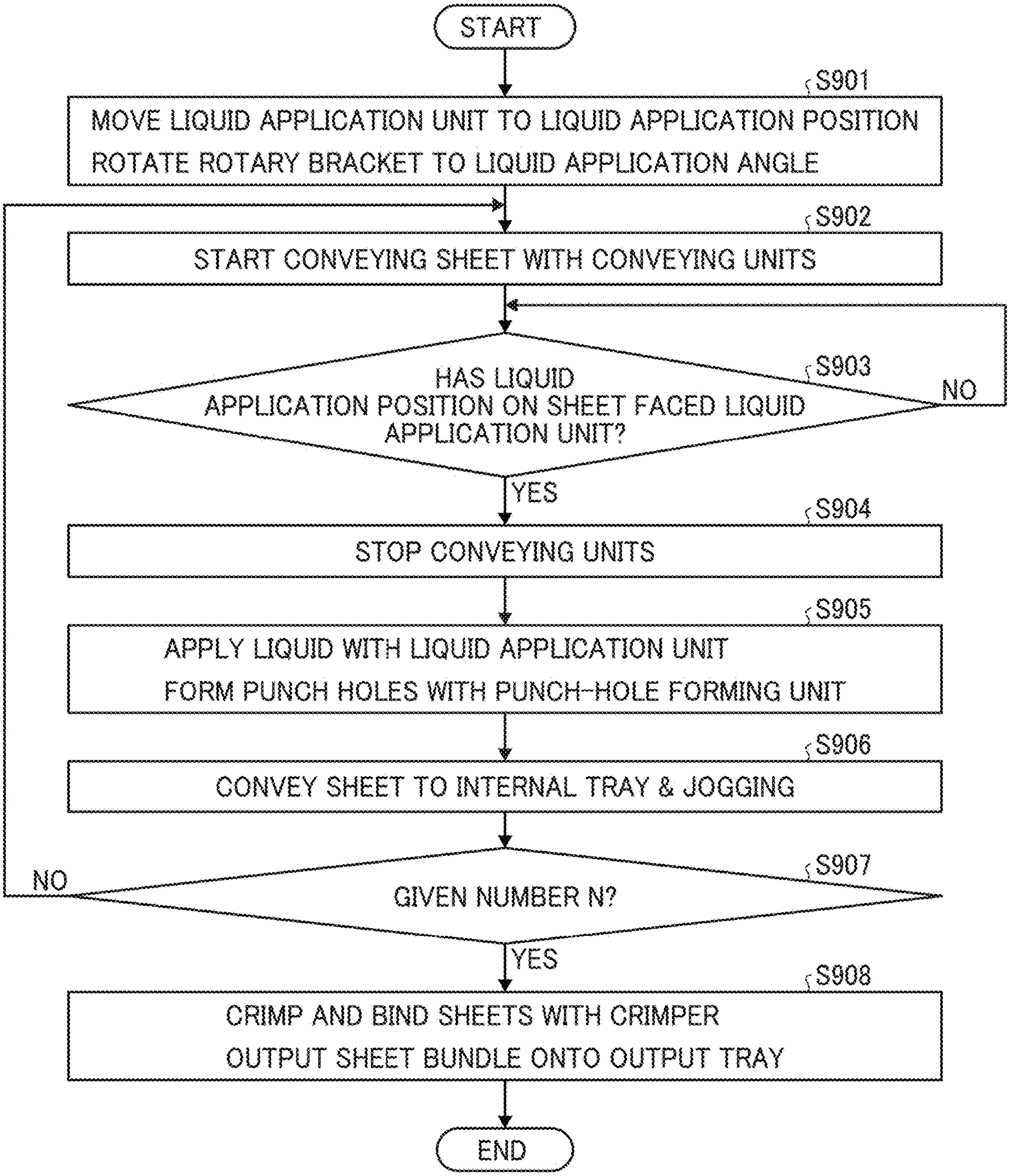
FIG. 28 is a flowchart of post-processing performed by the post-processing apparatus according to the second embodiment of the present disclosure.

FIG. 28 is a flowchart of post-processing. For example, the controller 100 executes the post-processing illustrated in FIG. 28 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the binding position (i.e., the liquid application position), a binding angle (i.e., a liquid application angle), and a process executed in parallel with the liquid application process (forming punch holes in the present embodiment). In the following description, the number of sheets P of the sheet bundle Pb may be referred to as "given number N of sheets." Note that, at the start of the post-processing, the liquid application unit 140 is at the home position whereas the rotary bracket 142 is held at a home angle.

First, in step S901, the controller 100 drives the slide motor 137 to move the liquid application unit 140 from the home position to a position where the liquid application unit 140 can face the liquid application position. In addition, the controller 100 drives the rotary motor 150 to rotate the rotary bracket 142 from the home angle to the liquid application angle.

It is ascertained based on a pulse signal output from a rotary encoder of the slide motor 137 that the liquid application unit 140 has reached the position where the liquid application unit 140 can face the liquid application position. Similarly, it is ascertained based on a pulse signal output from a rotary encoder of the rotary motor 150 that the rotary bracket 142 has reached the liquid application angle.

Next, in step S902, the controller 100 drives the conveyance roller pairs 10 and 11 to start conveying the sheet P on which an image is formed by the image forming apparatus 2. In step S903, the controller 100 determines whether the liquid application position on the sheet P has faced the liquid application unit 140 (more specifically, the liquid application head 146). When the liquid application position on the sheet P has not faced the liquid application head 146 (NO in step S903), the controller 100 repeats the determination in step S903 while continuing driving the conveyance roller pairs 10 and 11. By contrast, when the liquid application position on the sheet P has faced the liquid application head 146 (YES in step S903), in step S904, the controller 100 stops the conveyance roller pairs 10 and 11. It is ascertained based on a pulse signal output from a rotary encoder of a motor that drives the conveyance roller pairs 10 and 11 that the liquid application position on the sheet P has faced the liquid application head 146.

In step S905, the controller 100 executes the process of applying the liquid to the liquid application position on the sheet P with the liquid applier 131 and the process of forming punch holes in the sheet P with the punch-hole forming unit 132 in parallel. More specifically, the controller 100 rotates the movement motor 151 in the first direction to bring the liquid application head 146 into contact with the liquid application position on the sheet P. In addition, the controller 100 changes the pressing force of the liquid application head 146 (in other words, the amount of rotation of the movement motor 151) depending on the amount of liquid applied to the sheet P.

The amount of liquid applied to the sheet P may be the same for all the sheets P of the sheet bundle Pb or may be different for each sheet P. For example, the controller 100 may apply a decreased amount of liquid to the sheet P conveyed later. The amount of rotation of the movement motor 151 may be ascertained based on a pulse signal output from a rotary encoder of the movement motor 151.

In step S906, the controller 100 drives the conveyance roller pairs 10, 11, 14, and 15 to place the sheet P on the internal tray 22. The controller 100 also moves the side fences 24L and 24R to align the position of the sheet bundle Pb supported on the internal tray 22 in the main scanning direction. In short, the controller 100 performs so-called jogging.

In step S907, the controller 100 determines whether or not the number of sheets P placed on the internal tray 22 has reached the given number N of sheets instructed by the post-processing command. When the controller 100 determines that the number of sheets P placed on the internal tray 22 has not reached the given number N of sheets (NO in step S907), the controller 100 executes the operations of steps S902 to S906 again.

By contrast, when the controller 100 determines that the number of sheets P placed on the internal tray 22 has reached the given number N of sheets (YES in step S907), in step S908, the controller 100 causes the edge binding unit 25 to crimp and bind the binding position (i.e., the liquid application position) on the sheet bundle Pb to which the liquid has been applied by the liquid applier 131. In addition, the controller 100 rotates the conveyance roller pair 15 to output the sheet bundle Pb crimped and bound to the output tray 26. Since the operations of steps S805 to S808 in FIG. 8, which illustrates the flowchart of the binding process according to the first embodiment, are similarly applied to the crimp binding performed by the edge binding unit 25, a redundant description thereof may be omitted.

The embodiments of the present disclosure are applied to the edge binding unit 25 that executes the edge stitching as described above. However, the embodiments of the present disclosure may be applied to the saddle binding unit 28 that executes the saddle stitching.

The control method described above may be implemented by, for example, a program. In other words, the control method is executed by a computer that causes an arithmetic device, a storage device, an input device, an output device, and a control device to operate in cooperation with each other based on a program. The program may be written in, for example, a storage device or a storage medium and distributed. Alternatively, the program may be distributed through, for example, an electric communication line.

Now, a description is given of some aspects of the present disclosure.

Initially, a description is given of a first aspect.

A medium processing apparatus includes a conveying unit, a liquid applier, a crimper, a liquid-applier pivot mechanism, and a crimper pivot mechanism. The conveying unit conveys a medium in a conveyance direction.

The liquid applier applies liquid to the medium, which is at least one medium, conveyed by the conveying unit.

The crimper presses and deforms a plurality of media including the medium to which the liquid is applied by the liquid applier, to bind the plurality of media.

The liquid-applier pivot mechanism pivots the liquid applier.

The crimper pivot mechanism pivots the crimper.

The liquid-applier pivot mechanism pivots the liquid applier about a pivot extending in a thickness direction of the medium. The crimper pivot mechanism pivots the crimper about another pivot extending in the thickness direction of the medium.

Now, a description is given of a second aspect.

In the medium processing apparatus according to the first aspect, the liquid-applier pivot mechanism and the crimper pivot mechanism pivot the liquid applier and the crimper, respectively, into a first binding posture and a second binding posture. A longitudinal direction of an end of each of the liquid applier and the crimper is along a width direction of the medium in the first binding posture and is inclined with respect to the width direction of the medium in the second binding posture.

Now, a description is given of a third aspect.

In the medium processing apparatus according to the second aspect, the liquid applier and the crimper are disposed at an identical position in the conveyance direction in each of the first binding posture and the second binding posture.

Now, a description is given of a fourth aspect.

In the medium processing apparatus according to the second or third aspect, the crimper and the liquid applier are inclined at an identical angle with respect to the width direction of the medium in the second binding posture.

Now, a description is given of a fifth aspect.

In the medium processing apparatus according to any one of the first to fourth aspects, the liquid-applier pivot mechanism and the crimper pivot mechanism pivot the liquid applier and the crimper, respectively, at an angle between a first binding posture and a third binding posture. A longitudinal direction of an end of each of the liquid applier and the crimper coincides with a width direction of the medium in the first binding posture and is orthogonal to the width direction of the medium in the third binding posture.

Now, a description is given of a sixth aspect.

In the medium processing apparatus according to any one of the first to fifth aspects, the liquid applier and the crimper are slidable along a guide shaft extending in a width direction of the medium between a standby position apart from the medium in the width direction of the medium and a binding position where the liquid applier and the crimper face the medium. The liquid applier is adjacent to the crimper and closer to the binding position than the crimper at the standby position.

Now, a description is given of a seventh aspect.

In the medium processing apparatus according to any one of the first to sixth aspects, the liquid-applier pivot mechanism and the crimper pivot mechanism pivot the liquid applier and the crimper, respectively, in conjunction with each other with a common driving source.

Now, a description is given of an eighth aspect.

In the medium processing apparatus according to any one of the first to sixth aspects, the liquid-applier pivot mechanism includes a driving source configured to drive and pivot the liquid applier. The crimper pivot mechanism includes another driving source configured to drive and pivot the crimper.

Now, a description is given of a ninth aspect.

In the medium processing apparatus according to any one of the first to eighth aspects, the liquid applier includes a liquid application member that applies the liquid to the medium. The liquid-applier pivot mechanism pivots the liquid application member and the liquid applier integrally.

Now, a description is given of a tenth aspect.

In the medium processing apparatus according to any one of the first to eighth aspects, the liquid applier includes a liquid application member that applies the liquid to the medium.

The liquid-applier pivot mechanism pivots the liquid application member alone.

Now, a description is given of an eleventh aspect.

The medium processing apparatus according to any one of the second to fourth aspects, further includes a main-scanning movement unit that moves the crimper and the liquid applier simultaneously in a main scanning direction orthogonal to the conveyance direction.

The liquid-applier pivot mechanism includes a posture switching mechanism that switches a posture of the liquid applier along with a movement of the liquid applier n the main scanning direction.

Now, a description is given of a twelfth aspect.

In the medium processing apparatus according to the eleventh aspect, the posture switching mechanism includes a posture switching member that rotates integrally with the liquid applier and a posture switcher that contacts the posture switching member and switches a posture of the posture switching member when the liquid applier moves in the main scanning direction.

Now, a description is given of a thirteenth aspect.

In the medium processing apparatus according to the twelfth aspect, the posture switcher pivots the liquid applier from the first binding posture to the second binding posture when the posture switching member passes by the posture switcher in a first direction along the main scanning direction.

The posture switcher pivots the liquid applier from the second binding posture to the first binding posture when the posture switching member passes by the posture switcher in a second direction opposite to the first direction along the main scanning direction.

Now, a description is given of a fourteenth aspect.

In the medium processing apparatus according to any one of the second to fourth aspects, when the crimper and the liquid applier are pivoted from the first binding posture to the second binding posture, the crimper is pivoted to the second binding posture before the liquid applier is pivoted to the second binding posture.

Now, a description is given of a fifteenth aspect.

In the medium processing apparatus according to any one of the second to fourth aspects, when the crimper and the liquid applier are pivoted from the second binding posture to the first binding posture, the liquid applier is pivoted to the first binding posture before the crimper is pivoted to the first binding posture.

Now, a description is given of a sixteenth aspect.

The medium processing apparatus according to any one of the first to fifteenth aspects, further includes another liquid applier and another crimper. The liquid applier and the crimper are disposed opposite the other liquid applier and the other crimper in a width direction of the medium across a center of the medium.

Now, a description is given of a seventeenth aspect.

An image forming system includes an image forming apparatus and the medium processing apparatus according to any one of the first to sixteenth aspects. The image forming apparatus forms an image on the medium.

The medium processing apparatus crimps and binds the plurality of media on each of which the image is formed by the image forming apparatus.

The above-described embodiments are illustrative and do not limit the present invention.

Thus, numerous additional modifications and variations are possible in light of the above teachings. For example, elements and/or features of different illustrative embodiments may be combined with each other and/or substituted for each other within the scope of the present invention. It is therefore to be understood that the disclosure of this patent specification may be practiced otherwise by those skilled in the art than as specifically described herein and such modifications and alternatives are within the technical scope of the appended claims. Such embodiments and variations thereof are included in the scope and gist of the embodiments of the present disclosure and are included in the embodiments described in claims and the equivalent scope thereof. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

This patent application is based on and claims priority to Japanese Patent Application Nos. 2021-191068, filed on Nov. 25, 2021, 2022-155336, filed on Sep. 28, 2022, and 2022-175720, filed on Nov. 1, 2022, in the Japan Patent Office, the entire disclosure of each of which is hereby incorporated by reference herein.

REFERENCE SIGNS LIST

1: Image forming system
2: Image forming apparatus
3: Post-processing apparatus
10 to 19: Conveyance roller pairs
20: Switching claw
21, 26, 30: Output trays
22: Internal tray
23: End fence
24L, 24R: Side fences
25: Edge binding unit
28: Saddle binding unit
27: End fence
29: Sheet folding blade
31, 31L, 31R, 131: Liquid appliers
31*a*: Liquid application frame
32, 32L, 32R: Crimpers
32*a*: Crimping frame
32*b*, 32*c*: Binding teeth
32*d*: Contact-separation motor
33: Lower pressure plate
34: Upper pressure plate
34*a*, 148*a*: Through holes
35: Movement mechanism
36: Liquid application mechanism
37: Movement motor
38: Trapezoidal screw
39: Nut
40: Base plate
40*a*: Movement sensor
41*a*, 41*b*, 147*a*, 147*b*: Columnar members
42*a*, 42*b*, 57*b*, 149*a*, 149*b*: Coil springs
43, 143: Liquid storage tanks
43*a*: Liquid amount sensor
44: Liquid application member
45: Supply member
45*a*: Protection member
46: Joint
47: Slide mechanism
48: Base member
49: Guide shaft
50, 137: Slide motors
51: Position sensor
52: Pivot mechanism
53: Liquid applier pivot
54: Crimper pivot
55, 57, 58: Coupling mechanisms
55*a*: First pulley
55*b*: Second pulley
55*c*: Timing belt
56: Pivot motor
57*a*, 58*a*: Torsion coil springs
58*b*: Link member
58*c*: Guide member
100: Controller
101: CPU
102: RAM
103: ROM
104: HDD
105: I/F
109: Common bus
110: Control panel
132: Punch-bole forming unit
133*a*, 133*b*: Guide shafts
134*a*, 134*b*: Pulleys
135, 136: Endless angular belts
137*a*: Output shaft
138: Home position sensor
140: Liquid application unit
141: Base member
142: Rotary bracket
144: Mover
145: Holding member
146: Liquid application head
148: Pressure plate
150: Rotary motor
152: Home angle sensor
331: Lower-pressure-plate holder

The invention claimed is:

1. A medium processing apparatus comprising:

a conveying mechanism configured to convey a medium in a conveyance direction;

a first liquid applier configured to apply liquid to the medium conveyed by the conveying mechanism;

a first crimper configured to press and deform a plurality of media including the medium to which the liquid is applied by the first liquid applier, to bind the plurality of media;

a liquid-applier pivot mechanism configured to pivot the first liquid applier about a first pivot point extending in a thickness direction of the medium; and a crimper pivot mechanism configured to pivot the first crimper about a second pivot point extending in the thickness direction of the medium.

2. The medium processing apparatus according to claim 1, wherein the liquid-applier pivot mechanism and the crimper pivot mechanism are configured to pivot the first liquid applier and the first crimper, respectively, into a first binding posture and a second binding posture; and a longitudinal direction of an end of each of the first liquid applier and the first crimper is along a width direction of the medium in the first binding posture and is inclined with respect to the width direction of the medium in the second binding posture.

3. The medium processing apparatus according to claim 2, wherein the first liquid applier and the first crimper are located at an identical position in the conveyance direction in each of the first binding posture and the second binding posture.

4. The medium processing apparatus according to claim 2, wherein the first crimper and the first liquid applier are configured to be inclined at an identical angle with respect to the width direction of the medium in the second binding posture.

5. The medium processing apparatus according to claim 1, wherein the liquid-applier pivot mechanism and the crimper pivot mechanism are configured to pivot the first liquid applier and the first crimper, respectively, at an angle between two binding postures; and a longitudinal direction of an end of each of the first liquid applier and the first crimper coincides with a width direction of the medium in one of the two binding postures and is orthogonal to the width direction of the medium in another one of the two binding postures.

6. The medium processing apparatus according to claim 1, wherein the first liquid applier and the first crimper are configured to slide along a guide shaft extending in a width direction of the medium between a standby position apart from the medium in the width direction of the medium and a binding position where the first liquid applier and the first crimper face the medium; and the first liquid applier is adjacent to the first crimper and closer to the binding position than the first crimper at the standby position.

7. The medium processing apparatus according to claim 1, wherein the liquid-applier pivot mechanism and the crimper pivot mechanism are configured to pivot the first liquid applier and the first crimper, respectively, in conjunction with each other with a common driving source.

8. The medium processing apparatus according to claim 1, wherein the liquid-applier pivot mechanism includes a driving source configured to drive and pivot the first liquid applier; and the crimper pivot mechanism includes another driving source configured to drive and pivot the first crimper.

9. The medium processing apparatus according to claim 1, wherein the first liquid applier includes a liquid application member configured to apply the liquid to the medium; and the liquid-applier pivot mechanism is configured to pivot the liquid application member and the first liquid applier integrally.

10. The medium processing apparatus according to claim 1, wherein the first liquid applier includes a liquid application member configured to apply the liquid to the medium; and the liquid-applier pivot mechanism is configured to pivot the liquid application member alone.

11. The medium processing apparatus according to claim 2, further comprising:

a main-scanning movement mechanism configured to move the first crimper and the first liquid applier simultaneously in a main scanning direction orthogonal to the conveyance direction; and the liquid-applier pivot mechanism includes a posture switching mechanism configured to switch a posture of the first liquid applier along with a movement of the first liquid applier in the main scanning direction.

12. The medium processing apparatus according to claim 11, wherein the posture switching mechanism includes:

a posture switching member configured to rotate integrally with the first liquid applier; and a posture switcher configured to contact the posture switching member and switch a posture of the posture switching member in response to the first liquid applier moving in the main scanning direction.

13. The medium processing apparatus according to claim 12, wherein the posture switcher is configured to:

pivot the first liquid applier from the first binding posture to the second binding posture in response to the posture switching member passing by the posture switcher in a first direction along the main scanning direction; and pivot the first liquid applier from the second binding posture to the first binding posture in response to the posture switching member passing by the posture switcher in a second direction opposite to the first direction along the main scanning direction.

14. The medium processing apparatus according to claim 2, wherein the first crimper is configured to:

pivot to the second binding posture before the first liquid applier is pivoted to the second binding posture, in response to the first crimper and the first liquid applier being pivoted from the first binding posture to the second binding posture.

15. The medium processing apparatus according to claim 2, wherein the first liquid applier is configured to:

pivot to the first binding posture before the first crimper is pivoted to the first binding posture, in response to the first crimper and the first liquid applier being pivoted from the second binding posture to the first binding posture.

16. The medium processing apparatus according to claim 1, further comprising:

a second liquid applier; and a second crimper; and the first liquid applier and the first crimper are opposite the second liquid applier and the second crimper in a width direction of the medium across a center of the medium.

17. An image forming system comprising:

an image forming apparatus configured to form at least one image on plurality of media; and the medium processing apparatus according to claim 1, the medium processing apparatus configured to crimp and bind the plurality of media on each of which the at least one image is formed by the image forming apparatus.

* * * * *